(12) United States Patent
Watanabe et al.

(10) Patent No.: US 6,587,647 B1
(45) Date of Patent: Jul. 1, 2003

(54) METHOD AND SYSTEM OF REMOTE MONITORING OF IMAGE FORMING APPARATUS

(75) Inventors: Motoo Watanabe, Montville, NJ (US); Gregory Wright, Montville, NJ (US)

(73) Assignee: Ricoh Co., Ltd., Tokyo (JP)

( * ) Notice: Subject to any disclaimer, the term of this patent is extended or adjusted under 35 U.S.C. 154(b) by 0 days.

(21) Appl. No.: 09/986,349

(22) Filed: Nov. 8, 2001

Related U.S. Application Data

(60) Provisional application No. 60/330,813, filed on Oct. 31, 2001.

(51) Int. Cl.$^7$ .......................... G03G 15/00; B41B 15/00
(52) U.S. Cl. .................................. 399/8; 399/9; 399/11; 395/114
(58) Field of Search ...................... 399/8, 9, 11; 702/56, 702/188; 358/1.14, 1.15; 395/114

(56) References Cited

U.S. PATENT DOCUMENTS 5,819,110 A 10/1998 Motoyama
5,887,216 A * 3/1999 Motoyama ..................... 399/8

FOREIGN PATENT DOCUMENTS

JP 2001-136192 5/2001

OTHER PUBLICATIONS

U.S. patent application Ser. No. 09/986,349, filed Nov. 8, pending.
U.S. patent application Ser. No. 09/986,384, filed Nov. 8, pending.
U.S. application Ser. No. 09/408,443, Tetsuro Motoyama, et al., Method and System for Remote Diagnostic, Control and Information Collection Based on Various Communication Modes for Sending Messages to a Resource Manager, Sep. 29, 1999.
Hitachi Koki Imaging Solutions, Inc., *The Internet Document Controller*, Oct., 2000, pp. 2–8.

* cited by examiner

*Primary Examiner*—Hoang Ngo
(74) *Attorney, Agent, or Firm*—Oblon, Spivak, McClelland, Maier & Neustadt, P.C.

(57) ABSTRACT

A method and system for monitoring and controlling machines, such as printers, copiers, facsimile machine and other image forming machines. A server is used for transmitting and communicating information among machines and computers. The server acquires, after machine installation, reference values and during operation, current condition information. The server evaluates this information with the reference values such that a response to the machine may be executed remotely. The server also may update the reference values which change during operation.

28 Claims, 44 Drawing Sheets

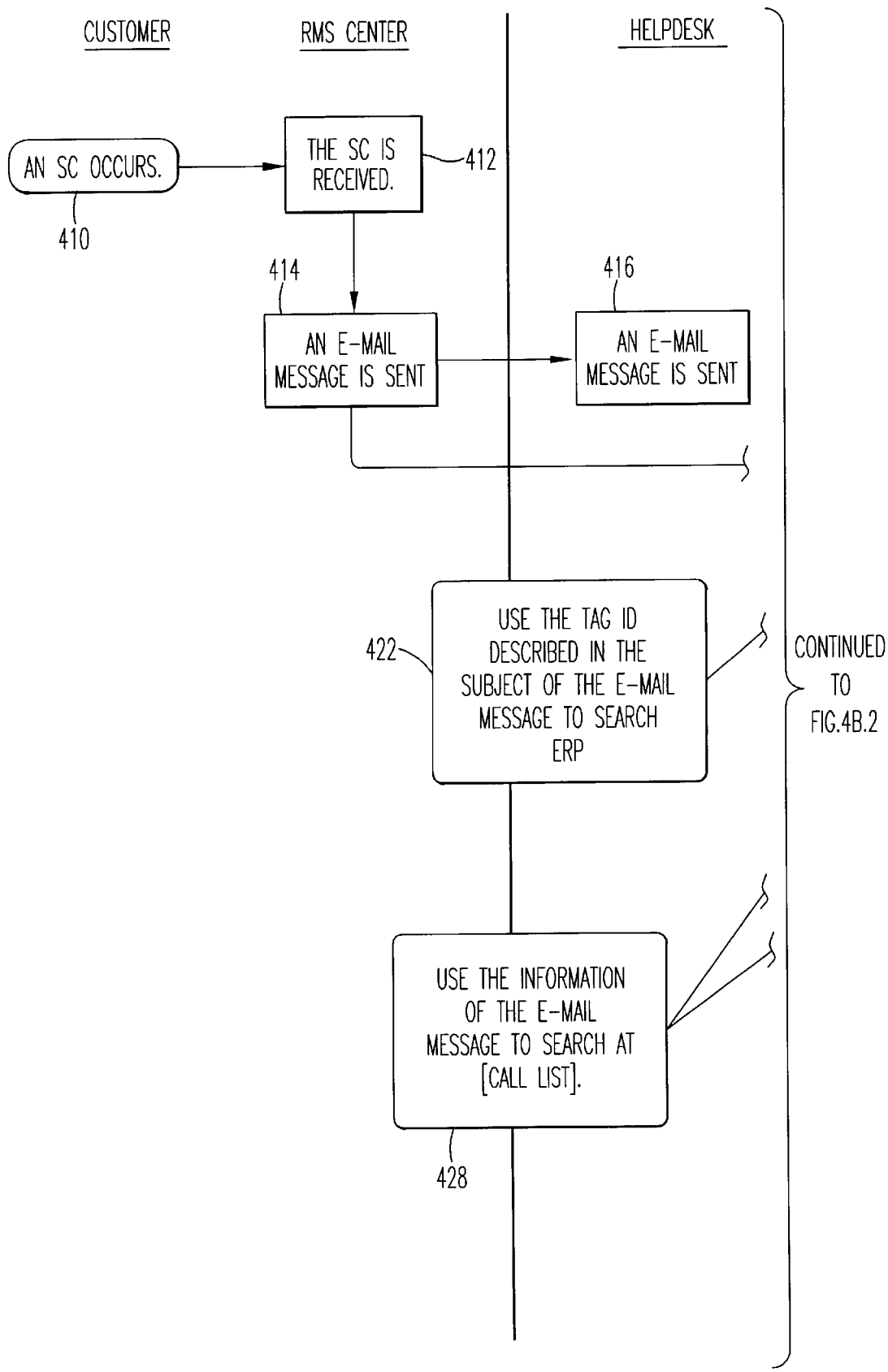
FIG. 4A.1

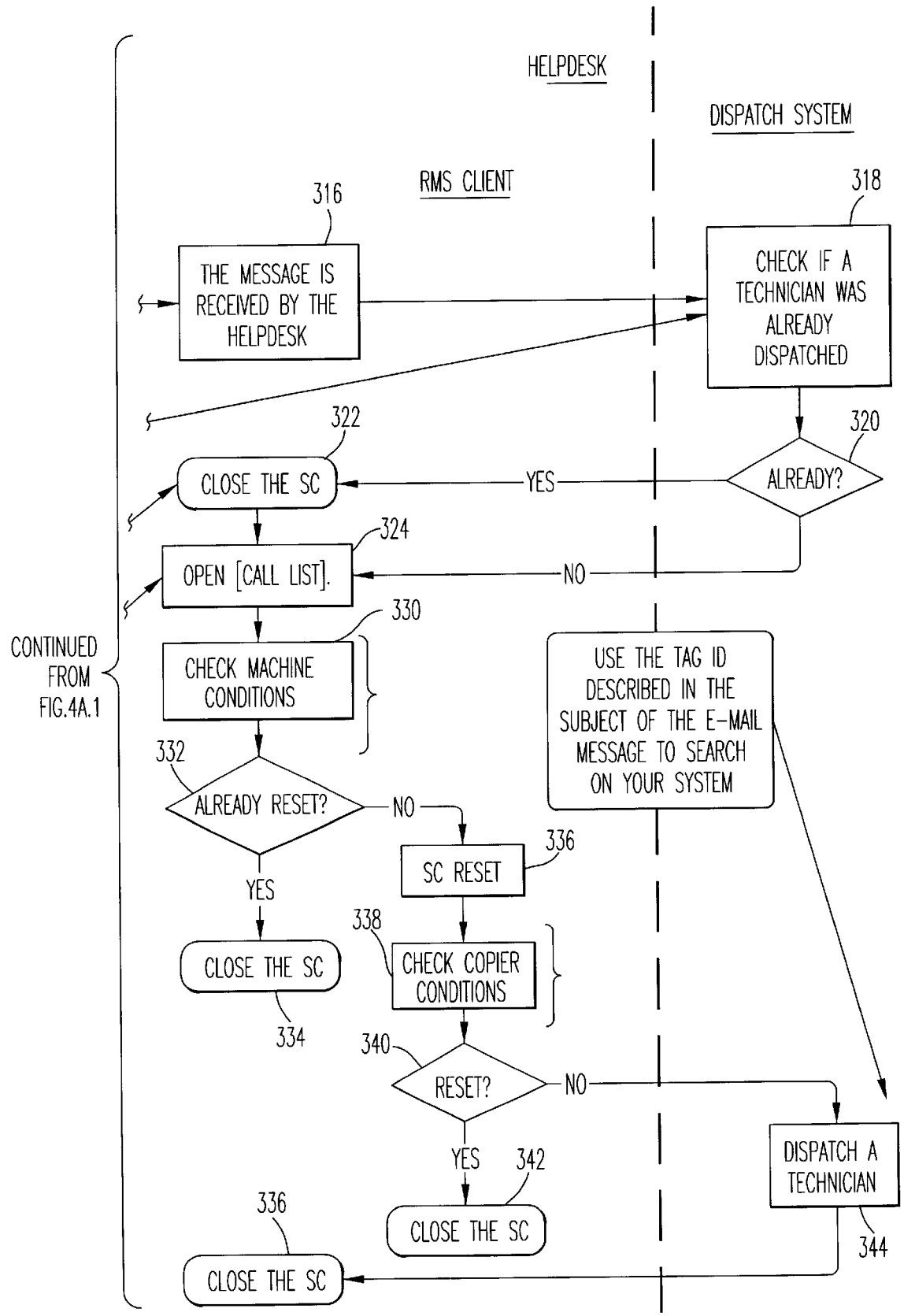
FIG. 4A.2

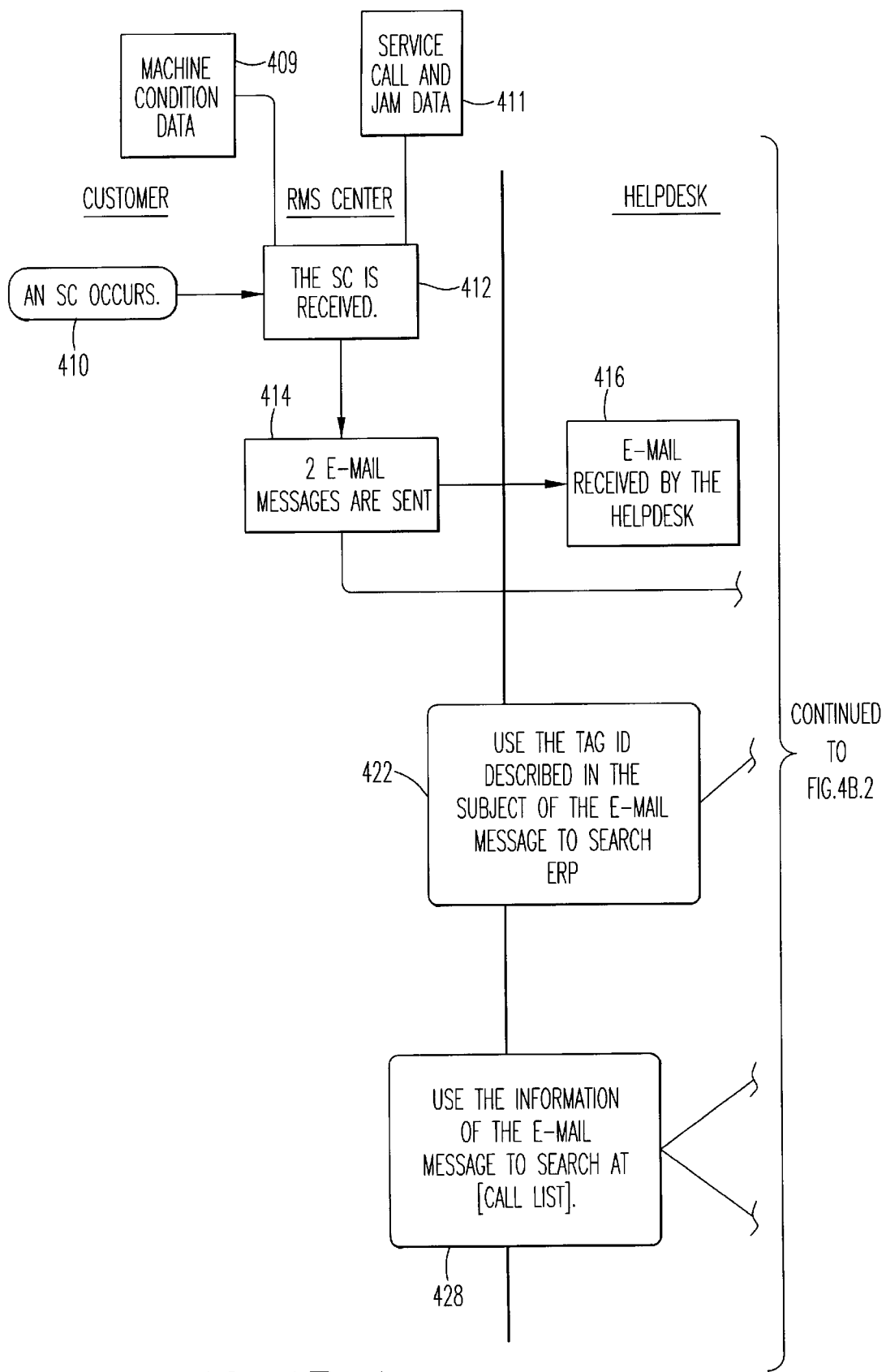
FIG.4B.1

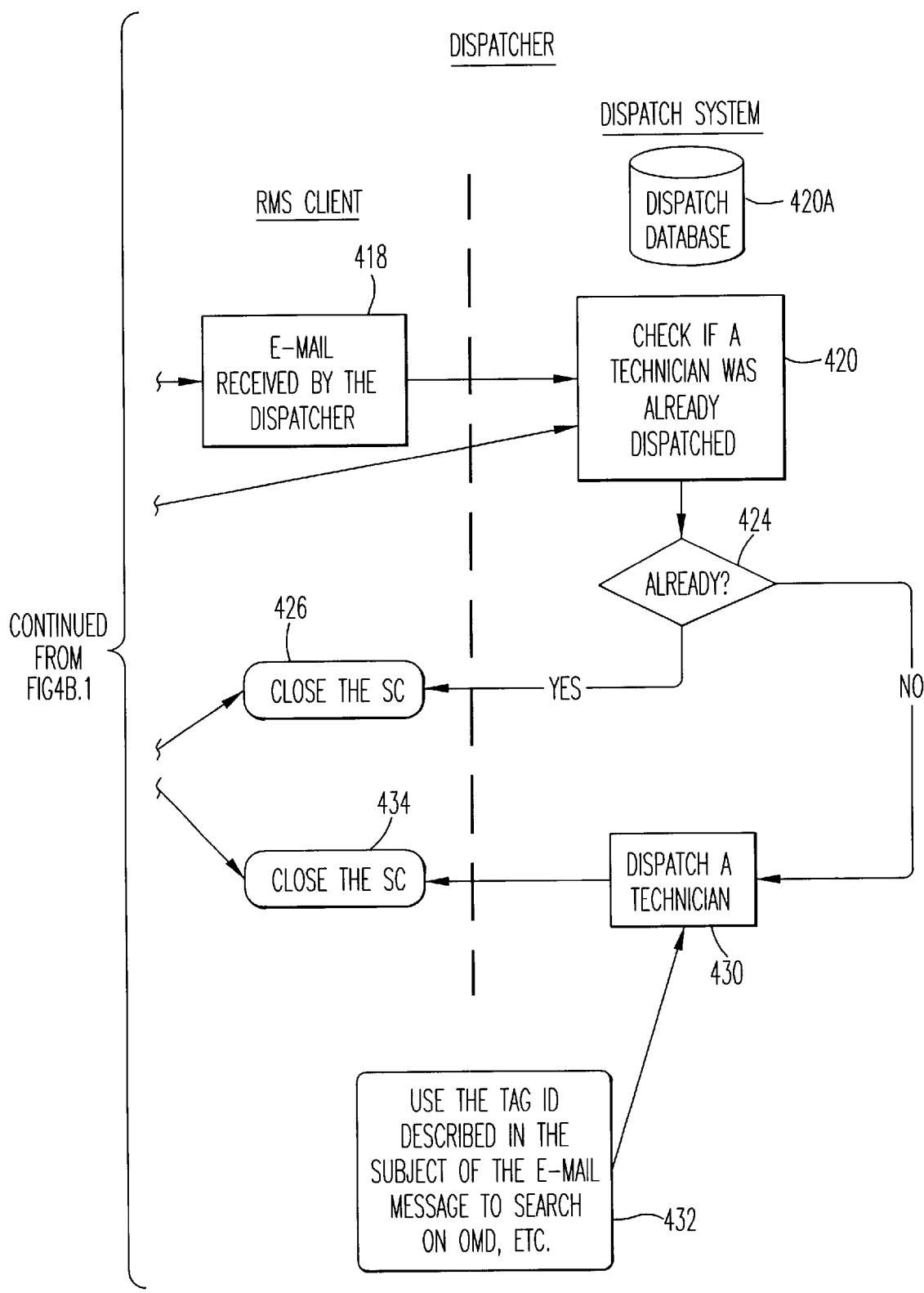
FIG.4B.2

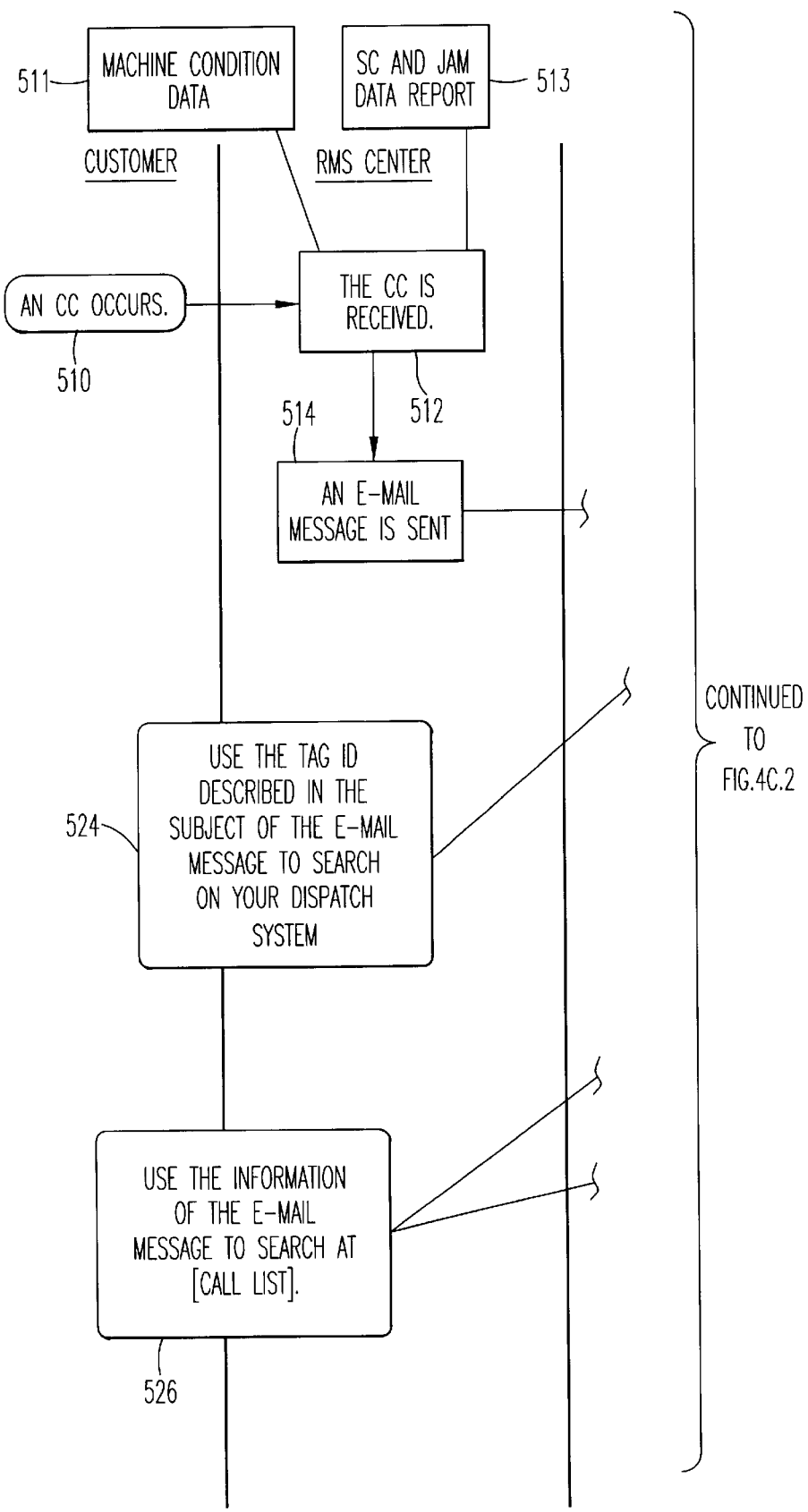
FIG. 4C.1

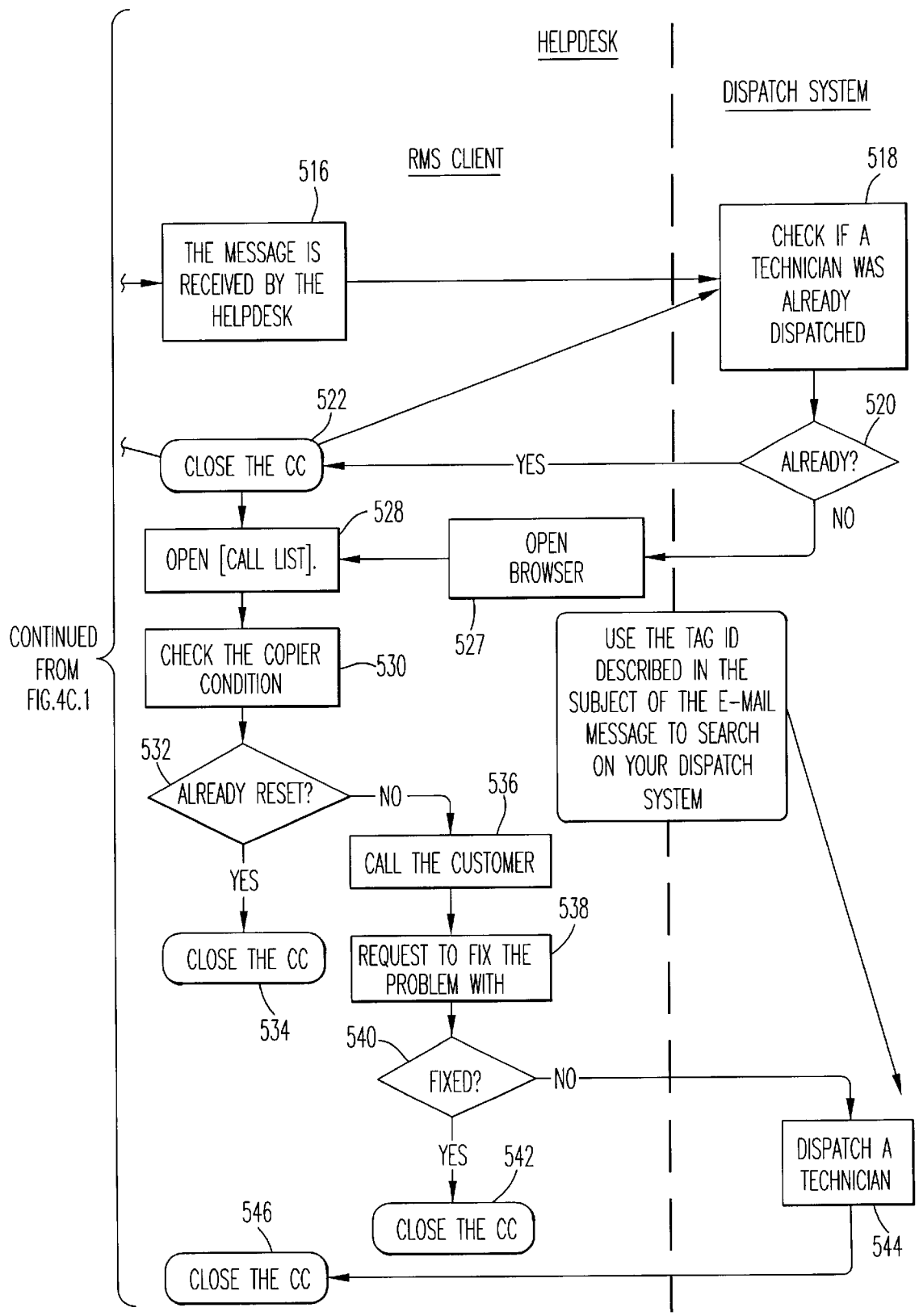
FIG. 4C.2

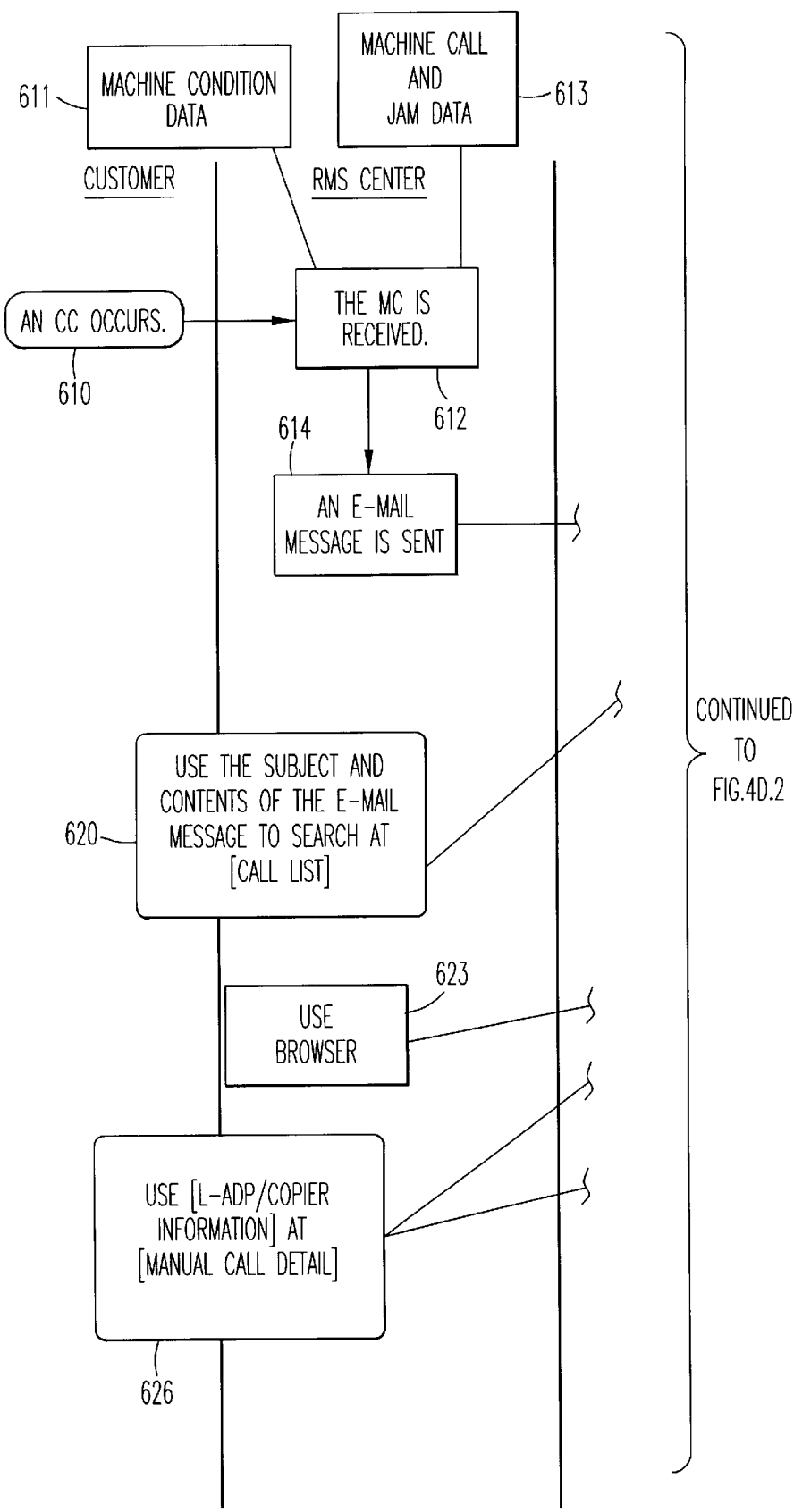
FIG.4D.1

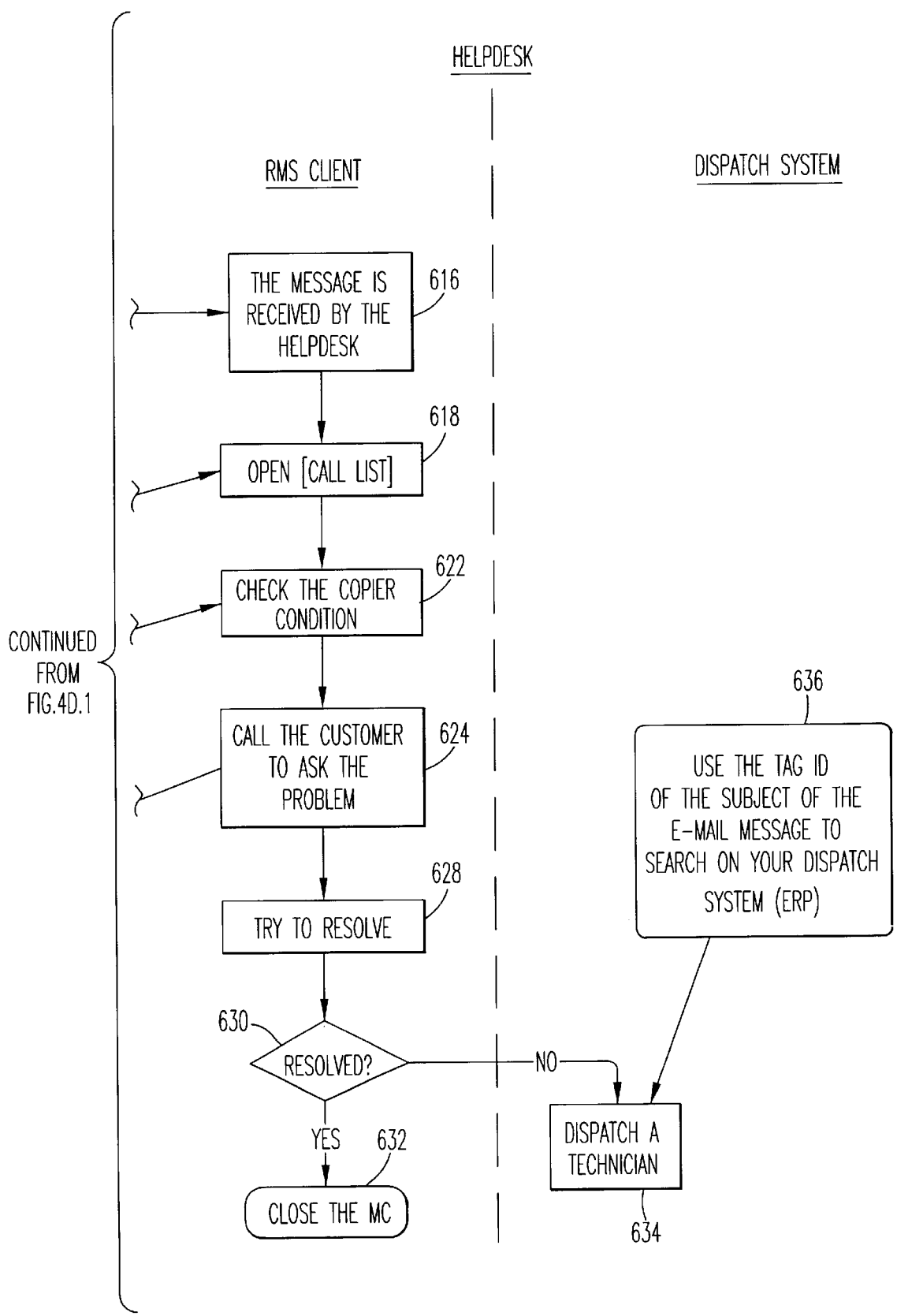
FIG. 4D.2

ADDRESS:
HELPDESK@METR8.COM

950

1. SUBJECT:
2. MACHINE CALL (MC); RECEIVED TAG ID#YYYYY
3. CONTENT:
4. CUSTOMER NAME
5. CUSTOMER ADDRESS
6. CUSTOMER PHONE NUMBER
7. MODEL NAME
8. COPIER S/N
9. TAG ID#
10. SC CODE NUMBER
11. RECEIVE DATE AND TIME

*FIG. 8A*

960 rms@rms      TO: GREGORY WRIGHT@RICOH-USA.COM
             CC: MACHINE CALL
03/01/01  07:28 PM   SUBJECT: RECEIVED, TAG ID#NSC 850

*FIG. 8B*

CALL LIST 1400

| SEQ | SO | CUSTOMER | MODEL | MACHINE NOTIFICATION CALL | CAUSE/ SOLUTION INPUT | LC LIST | CALL | TIME RECIEVER | ELAPSED TIME | OPERATOR |
|---|---|---|---|---|---|---|---|---|---|---|
| 1410 | 1412 | 1414 | 1416 | 1418 | 1420 | 1422 | 1424 | 1426 | 1428 | 1430 |
| 1 | METRO SALES | OFFICE COMPANY 1 | A 850 | MC | | | | 12:00 | 00:30 | GREG |
| 2 | METRO SALES | OFFICE COMPANY 2 | AB 850 | SC | | | | 1:00 | 00:15 | JOAN |
| ... | | | | | | | | | | |
| n | METRO SALES | OFFICE COMPANY 2 | AB 800 | TEL | | | | 3:15 | 00:42 | GREG |

FIG. 13

CALL DETAIL

SYMPTOM, CAUSE AND SOLUTION

| SYMPTOM | ☐ |
| --- | --- |
| | MANUAL CALL |
| CAUSE | |
| SOLUTION | ☐ |

— 1510

L-ADP/COPIER INFORMATION

| DATE RECEIVED | 03-02-2001 09:28 | |
| --- | --- | --- |
| CUSTOMER | RICOH | |
| INSTALLED SECTION | FLOOR | |
| CONTACT | TEL | |
| MODEL/SERIALNUMBER | AFICIO850/H3600300601 | |
| PARTICULAR NOTES | | |
| TAG ID | NSC 850 | |
| SO/SD | RC(TEST) / RC(TEST) SERVICE | |

— 1520

UNSETTLED

| SEQ | SC | TIME RECEIVED | ELAPSED TIME |
| --- | --- | --- | --- |
| 1 | TEL | 08:49 | 50:46 |

— 1530

| READ/WRITE | — 1540 |
| --- | --- |
| MACHINE CONDITION DATA | — 1550 |
| SERVICE CALL/JAM DATA | — 1560 |
| CALL HISTORY | — 1570 |
| LOOP TEST | — 1580 |
| EXECUTE | — 1582 |
| READ | — 1584 |

SERVICE CALL AND JAM DATA

L-ADP/COPIER INFORMATION

| | |
|---|---|
| DATE RECEIVED | 03-02-2001 09:28 |
| CUSTOMER | RICOH |
| INSTALLED SECTION | FLOOR |
| CONTACT | TEL |
| MODEL/SERIALNUMBER | AFICIO850/H3600300601 |
| PARTICULAR NOTES | |
| TAG ID | NSC 850 |
| SO/SD | RC(TEST) / RC(TEST) SERVICE |

SC AND JAM DATA

| NO. | ITEM | RESULT |
|---|---|---|
| 1 | MACHINE CONDITION | 2 |
| 2 | SC DETAILS | sp_wcom.c LINE:1288 VAL : -13 |
| 3 | TOTAL PAPER JAMS | 0057 |
| 4 | TOTAL P.JAMS BY TRAY 1 | 0002 |
| 5 | TOTAL P.JAMS BY TRAY 2 | 0004 |
| 6 | TOTAL P.JAMS BY LCT(TRAY 3) | 0001 |
| 7 | TOTAL P.JAMS BY LCT EXIT | 0002 |
| 8 | TOTAL P.JAMS BY REGISTRATION | 0006 |
| 9 | TOTAL P.JAMS BY EXIT | 0005 |
| 10 | TOTAL ORIGINAL JAMS | 0079 |
| 11 | TOTAL P.JAMS BY DUP.ENTRANCE | 0005 |
| 12 | TOTAL P.JAMS BY DUP.TRANS.3 | 0001 |
| 13 | TOTAL P.JAMS BY INVERTER | 0006 |
| 14 | TOTAL P.JAMS BY FIN. ENTRANCE | 0005 |

*FIG. 14B*

| 16 | TOTAL P.JAMS BY FIN. SHIFT T | 0006 |
| 17 | TOTAL P.JAMS BY FIN. STAPLE 1 | 0005 |
| 18 | TOTAL P.JAMS BY FIN. STAPLE 2 | 0007 |
| 19 | TOTAL P.JAMS BY FIN. STAPLE 3 | 0001 |
| 20 | TOTAL ORIG'L JAMS:ADF FEED | 0070 |
| 21 | TOTAL ORIG'L JAMS:ADF EXIT | 0009 |
| 22 | TOTAL P.JAMS BY LT(S) | 0048 |
| 23 | TOTAL P.JAMS BY OTHER SIZE | 0002 |
| 24 | TOTAL P.JAMS BY DLT | 0002 |
| 25 | TOTAL P.JAMS BY LG | 0001 |
| 26 | TOTAL P.JAMS BY LT(L) | 0004 |
| 27 | P.JAMS HISTORY: LATEST 0 | 232632616 |
| 28 | P.JAMS HISTORY: LATEST 1 | 232630278 |
| 29 | P.JAMS HISTORY: LATEST 2 | 282630277 |

*FIG. 14C*

READ/WRITE IMAGE MACHINE DATA

L-ADP/COPIER INFORMATION

| | |
|---|---|
| DATE RECEIVED | 03-02-2001 09:28 |
| CUSTOMER | RICOH |
| INSTALLED SECTION | FLOOR |
| CONTACT | TEL |
| MODEL/SERIAL NUMBER | AFICIO850/H3600300601 |
| PARTICULAR NOTES | |
| TAG ID | NSC 850 |
| SO/SD | RC(TEST) / RC(TEST) SERVICE |

READ/WRITE ITEMS

| NO. | ITEM | STANDARD | TOLERANCE | REFERENCE PARAMETERS | CURRENT PARAMETERS | NEW |
|---|---|---|---|---|---|---|
| 1 | ● L.EDGE REGIST. ADJ.PT:1001-1 | +00 | -90 - +90 | 0.1 | 0.5 | ☐ |
| 2 | ○ L.EDGE REGIST. ADJ.DT:1001-2 | +00 | -90 - +90 | 0 | 0 | ☐ |
| 3 | ○ S-TO-S REGIST. ADJ.T1:1002-1 | -15 | -90 - +90 | -3.9 | -3.9 | ☐ |
| 4 | ○ S-TO-S REGIST. ADJ.T2:1002-2 | -15 | -90 - +90 | -2.7 | -5 | ☐ |
| 5 | ○ S-TO-S REGIST. ADJ.T3:1002-3 | -15 | -90 - +90 | -3 | | ☐ |
| 6 | ○ S-TO-S REGIST. ADJ.T4:1002-4 | -25 | -90 - +90 | -2 | | ☐ |

| | | | | | |
|---|---|---|---|---|---|
| 7 | ○S-TO-S REGIST. ADJ.T5:1002-5 | -25 | -90 — +90 | -2 | |
| 8 | ○S-TO-S REGIST. ADJ.T6:1002-6 | -25 | -90 — +90 | -1.5 | |
| 9 | ○S-TO-S REGIST. ADJ.DT:1002-7 | -30 | -90 — +90 | -3.7 | |
| 10 | ○FUSING TEIMP. ADJ.STNDBY:1105-1 | 173 | 168 — 178 | 173 | 179 |
| 11 | ○FUSING TEIMP. ADJ. | 015 | 000 — 020 | 015 | -5 |
| 12 | ○FUSING TEIMP. ADJ.A4/LT :1105-4 | 010 | 000 — 020 | +10 | 15 |
| 13 | ○WEB M. CONT'I DISP/ADJ.:1902-1 | 0 | 000 — 102 | 102 | |
| 14 | ○C.CORONA BAIS ADJ. IA:2001-1 | 1000 | 0600 — 1300 | 1000 | |
| 15 | ○C.CORONA BAIS ADJ. ID:2001-2 | 800 | 0600 — 1300 | 0800 | |
| 16 | ○ERASE MGN ADJ. L-EDGE :2101-1 | 25 | 00 — 90 | 0.25 | |
| 17 | ○ERASE MGN ADJ. T-EDGE :2101-2 | 25 | 00 — 90 | 0.23 | |
| 18 | ○ERASE MGN ADJ.LEFT :2101-3 | 20 | 00 — 90 | 0.2 | |
| 19 | ○ERASE MGN ADJ.RIGHT :2101-4 | 20 | 00 — 90 | 0.27 | |

*FIG. 15B*

| | | | | | |
|---|---|---|---|---|---|
| 20 | ○DEVELOPMENT BIAS ADJ.:2201-1 | 530 | 200 – 700 | 620 | |
| 21 | ○TONER SUPPLY MODE SET:2208-1 | 0 | 0 – 1 | 0 | |
| 22 | ○TONER SUPPLY RATE SET:2209-1 | 0800/1k | 0100 – 2000 | 0800 | |
| 23 | ○VREF MANUAL SETTING :2220 | 250 | 160 – 350 | 203 | |
| 24 | ○T.CURRENT ADJ.1STSIDE:2301-1 | 120/140 | 010 – 200 | 140 | |
| 25 | ○T.CURRENT ADJ.THICK :2301-2 | 120/140 | 010 – 200 | 120 | |
| 26 | ○T.CURRENT ADJ.OHP :2301-3 | 140/140 | 010 – 200 | 140 | |
| 27 | ○T.CURRENT ADJ.TRANSP.:2301-4 | 120/140 | 010 – 200 | 140 | |
| 28 | ○T.CURRENT ADJ.2NDSIDE:2301-5 | 120/140 | 010 – 200 | 120 | |
| 29 | ○T.CURRENT ADJ.BET.P :2301-6 | 20 | 010 – 200 | 020 | |
| 30 | ○CLEANING INTERVAL SET:2506-1 | 1 | 0 – 1 | 1 | |
| 31 | ○CLEANING INTERVAL ADJ:2506-2 | 030 | 001 – 100 | 030 | |
| 32 | ○VCOUNT MANUAL SETTING:2906 | 097 | 040 – 240 | 0.96 | |

| | | | | | |
|---|---|---|---|---|---|
| 33 | ○ID SENSOR INITIAL SET:3001-1 | 62 | 000 – 255 | 061 | |
| 34 | ○SCAN.SUB SCAN MAG.ADJ.:4008 | +0 | -9 – +9 | 0 | |
| 35 | ○SCAN.L-EDGE REGIST.ADJ:4010 | +00 | -90 – +90 | -0.7 | |
| 36 | ○SCAN.S-TO-S REGIST.ADJ:4011 | +00 | -60 – +60 | -0.6 | |
| 37 | ○SBU SET:4902-25(FACTORY USE) | 117 | 000 – 255 | 143 | |
| 38 | ○PAPER TRAY PRIORITY SET(UT) | 1 | 1 – 6 | 1 | |
| 39 | ○A.P.S. PRIORITY SETTING(UT) | 0 | 0 – 1 | 0 | |
| 40 | ○A.I.D. PRIORITY SETTING(UT) | 0 | 0 – 1 | 0 | |
| 41 | ○PANEL TONE ON/OFF SET(UT) | 2 | 0 – 3 | 2 | |
| 42 | ○PRESET R/E RETIO KEY1 (UT) | 025 | 025 – 400 | 025 | |
| 43 | ○PRESET R/E RETIO KEY2 (UT) | 050 | 025 – 400 | 050 | |
| 44 | ○PRESET R/E RETIO KEY3 (UT) | 065 | 025 – 400 | 065 | |
| 45 | ○PRESET R/E RETIO KEY4 (UT) | 073 | 025 – 400 | 073 | |

| 46 | ○ PRESET R/E RETIO KEY5 (UT) | 078 | 025 – 400 | 078 | |
| 47 | ○ PRESET R/E RETIO KEY6 (UT) | 085 | 025 – 400 | 085 | |
| 48 | ○ PRESET R/E RETIO KEY7 (UT) | 093 | 025 – 400 | 093 | |
| 49 | ○ PRESET R/E RETIO KEY8 (UT) | 121 | 025 – 400 | 121 | |
| 50 | ○ PRESET R/E RETIO KEY9 (UT) | 129 | 025 – 400 | 129 | |
| 51 | ○ PRESET R/E RETIO KEY10 (UT) | 155 | 025 – 400 | 155 | |
| 52 | ○ PRESET R/E RETIO KEY11 (UT) | 200 | 025 – 400 | 200 | |
| 53 | ○ PRESET R/E RETIO KEY12 (UT) | 400 | 025 – 400 | 400 | |
| 54 | ○ COPY COUNT UP/DOWN SET(UT) | 0 | 0 – 1 | 0 | |
| 55 | ○ TRAY 1:PAPER TYPE SET (UT) | 0 | 0 – 2 | 0 | |
| 56 | ○ TRAY 2:PAPER TYPE SET (UT) | 0 | 0 – 4 | 0 | |
| 57 | ○ TRAY 3:PAPER TYPE SET (UT) | 0 | 0 – 4 | 0 | |
| 58 | ○ TRAY 4:PAPER TYPE SET (UT) | 0 | 0 – 7 | 0 | |

*FIG. 15E*

| | | | | | |
|---|---|---|---|---|---|
| 59 | ○TRAY 5:PAPER TYPE SET (UT) | 0 | 0/7 | 0 | |
| 60 | ○TRAY 6:PAPER TYPE SET (UT) | 0 | 0/4 | 0 | |
| 61 | ○MAX. COPY QUANTITY SET (UT) | 9999 | 0001/9999 | 9999 | |
| 62 | ○TRAY 1:PAPER SIZE SET (UT) | 005 | 000/255 | 038 | |
| 63 | ○TRAY 2:PAPER SIZE SET (UT) | 005 | 000/255 | 166 | |
| 64 | ○TRAY 3:PAPER SIZE SET (UT) | 005 | 000/255 | 160 | |
| 65 | ○TRAY 6:PAPER SIZE SET (UT) | 005 | 000/255 | 038 | |
| 66 | ○SYSTEM RESET TIMER SET(UT) | 060 | 000/999 | 060 | |
| 67 | ○COPY RESET TIMER SET(UT) | 060 | 000/999 | 060 | |
| 68 | ○PANEL OFF TIMER SETTING(UT) | 060 | 000/999 | 999 | |
| 69 | ○AUTO TRAY SWITCHING SET(UT) | 0 | 0/2 | 0 | |
| 70 | ○A3/DLT DOUBLE COUNT SET:5104 | 0 | 0/1 | 0 | |
| 71 | ○BORDER ERASE WIDTH SET(UT) | 03 | 01/20 | 04 | |

| 72 | ○ COMBINE ORIG.SHADOW ERASE | 0 | 0 — 1 | 0 | |
|---|---|---|---|---|---|
| 73 | ○ CENTER ERASE WIDTH SET(UT) | 03 | 01 — 20 | 04 | |
| 74 | ○ 1-2DUP.AUTO MARGIN ADJ.SET | 0 | 0 — 1 | 1 | |
| 75 | ○ DISABLE COPYING:SP5118 | 0 | 0 — 1 | 0 | |
| 76 | ○ DATE/TIME SET(Y;M;D;H;M;W) | | ****** — ****** | 2001022711332 | |
| 77 | ○ SETWEEKLYTIMER:SUN:ON (H;M) | 9999 | 0000 — 9999 | 9999 | |
| 78 | ○ SETWEEKLYTIMER:SUN:OFF (H;M) | 9999 | 0000 — 9999 | 9999 | |
| 79 | ○ SETWEEKLYTIMER:MON:ON (H;M) | 9999 | 0000 — 9999 | 9999 | |
| 80 | ○ SETWEEKLYTIMER:MON:OFF (H;M) | 9999 | 0000 — 9999 | 9999 | |
| 81 | ○ SETWEEKLYTIMER:TUE:ON (H;M) | 9999 | 0000 — 9999 | 9999 | |
| 82 | ○ SETWEEKLYTIMER:TUE:OFF (H;M) | 9999 | 0000 — 9999 | 9999 | |
| 83 | ○ SETWEEKLYTIMER:WED:ON (H;M) | 9999 | 0000 — 9999 | 9999 | |
| 84 | ○ SETWEEKLYTIMER:WED:OFF (H;M) | 9999 | 0000 — 9999 | 9999 | |

*FIG. 15G*

| | | | | 1620H | |
|---|---|---|---|---|---|
| 85 | ○ SETWEEKLYTIMER:THU:ON (H;M) | 9999 | 0000 – 9999 | 9999 | |
| 86 | ○ SETWEEKLYTIMER:THU:OFF (H;M) | 9999 | 0000 – 9999 | 9999 | |
| 87 | ○ SETWEEKLYTIMER:FRI:ON (H;M) | 9999 | 0000 – 9999 | 9999 | |
| 88 | ○ SETWEEKLYTIMER:FRI:OFF (H;M) | 9999 | 0000 – 9999 | 9999 | |
| 89 | ○ SETWEEKLYTIMER:FRI:ON (H;M) | 9999 | 0000 – 9999 | 9999 | |
| 90 | ○ SETWEEKLYTIMER:FRI:OFF (H;M) | 9999 | 0000 – 9999 | 9999 | |
| 91 | ○ KEY OP. CODE SETTING(UT) | | ****** – ****** | | |
| 92 | ○ AUTO OFF ON/OFF SET(SP) | 0 | 0 – 1 | 0 | |
| 93 | ○ AUTO OFF TIMER SETTING (UT) | 90 | 001 – 240 | 240 | |
| 94 | ○ C:USER CODE ON/OFF SET(UT) | 0 | 0 – 1 | 0 | |
| 95 | ○ C:KEY COUNTER ON/OFF SET(UT) | 0 | 0 – 1 | 0 | |
| 96 | ○ NOT USED | 0 | 0 – 1 | 0 | |
| 97 | ○ P:USER CODE ON/OFF SET(UT) | 0 | 0 – 1 | 0 | |

| 98 | ○P:KEY COUNTER ON/OFF SET(UT) | 0 | 0 – 1 | 0 | |
|---|---|---|---|---|---|
| 99 | ○NOT USED | 0 | 0 – 1 | 0 | |
| 100 | ○PM ALARM INTERVAL SET:5501 | 0 | 000 – 999 | 000 | |
| 101 | ○JAM ALARM LEVEL SET:5504-1 | 3 | 0 – 3 | 3 | |
| 102 | ○SC ALARM LEVEL SET:5505 | 30 | 000 – 255 | 030 | |
| 103 | ○NOT USED (CONSUMABLE ALARM) | 0 | ****** – ****** | 0 | |
| 104 | ○NOT USED (CONSUMABLE ALARM) | 0 | ****** – ****** | 0 | |
| 105 | ○NOT USED (CONSUMABLE ALARM) | 0 | ****** – ****** | 0 | |
| 106 | ○NOT USED (CONSUMABLE ALARM) | 01000 | 00250 – 10000 | 01000 | |
| 107 | ○NOT USED (CONSUMABLE ALARM) | 01000 | 00250 – 10000 | 01000 | |
| 108 | ○NOT USED (CONSUMABLE ALARM) | 01000 | 00250 – 10000 | 01000 | |
| 109 | ○NOT USED (CONSUMABLE ALARM) | 01000 | 00250 – 10000 | 01000 | |
| 110 | ○NOT USED (CONSUMABLE ALARM) | 01000 | 00250 – 10000 | 01000 | |

*FIG. 15I*

| | | | | 1620J | |
|---|---|---|---|---|---|
| 111 | ○NOT USED (CONSUMABLE ALARM) | 01000 | 00250 – 10000 | 01000 | |
| 112 | ○NOT USED (CONSUMABLE ALARM) | 01000 | 00250 – 10000 | 01000 | |
| 113 | ○NOT USED (CONSUMABLE ALARM) | 01000 | 00250 – 10000 | 01000 | |
| 114 | ○NOT USED (CONSUMABLE ALARM) | 01000 | 00250 – 10000 | 01000 | |
| 115 | ○NOT USED (CONSUMABLE ALARM) | 01000 | 00250 – 10000 | 01000 | |
| 116 | ○CC201/202 ON/OFF SETTING | 1 | ****** – ****** | 1 | |
| 117 | ○PM CLL INTERVAL:COPY:5513-1 | 0300 | 0001 – 9999 | 0300 | |
| 118 | ○PM CALL INTERVAL:ADF:5513-2 | 0300 | 0001 – 9999 | 0300 | |
| 119 | ○PM CALL SETTING:COPY:5514-1 | 1 | ****** – ****** | 1 | |
| 120 | ○PM CALL SETTING:ADF:5514-2 | 0 | ****** – ****** | 0 | |
| 121 | ○S/N FOR DISPLAY SETTING:5811 | | ****** – ****** | H3600300601 | |
| 122 | ○ID2 CODE:5811-3 | | ****** – ****** | H3600300601 | |

*FIG. 15J*

| | | | | 1620K | |
|---|---|---|---|---|---|
| 123 | ○ SERVICE PHONE NUMBER:5812-1 | | ****** – ****** | 00-0000-0000 | |
| 124 | ○ NOT USED (CONSUMABLE ALARM) | 0 | ****** – ****** | 0 | |
| 125 | ○ NOT USED (CONSUMABLE ALARM) | 0 | ****** – ****** | 0 | |
| 126 | ○ NOT USED (CONSUMABLE ALARM) | 0 | ****** – ****** | 0 | |
| 127 | ○ NOT USED (CONSUMABLE ALARM) | 0 | ****** – ****** | 0 | |
| 128 | ○ NOT USED (CONSUMABLE ALARM) | 0 | ****** – ****** | 0 | |
| 129 | ○ NOT USED (CONSUMABLE ALARM) | 0 | ****** – ****** | 0 | |
| 130 | ○ SADF AUTO RESET TIMER(UT) | 10 | 03 – 99 | 10 | |
| 131 | ○ STAPLE POSITION ADJ.:SP6105 | +00 | -35 – +35 | 0 | |
| 132 | ○ TOTAL COUNTER | | 0000000 – 9999999 | 0231033 | |
| 133 | ○ NOT USED (GPC COUNTER) | | 0000000 – 9999999 | 0035303 | |

*FIG. 15K*

MACHINE CONDITION DATA

L-ADP/COPIER INFORMATION

| | | |
|---|---|---|
| DATE RECEIVED | 03-02-2001 09:28 | |
| CUSTOMER | RICOH | |
| INSTALLED SECTION | FLOOR | |
| CONTACT | TEL | |
| MODEL/SERIALNUMBER | AFICIO850/H3600300601 | |
| PARTICULAR NOTES | | |
| TAG ID | NSC 850 | |
| SO/SD | RC(TEST) / RC(TEST) SERVICE | |

―1720

STATE INFO.                                            1730

| NO. | ITEM | RESULT |
|---|---|---|
| 1 | PAPER END:P.LCT(TRAY3) | 1 |
| 2 | MACHINE CONDITION | 2 |
| 3 | SC DETAILS | sp_wcom.c LINE:1288 VAL :-13 |
| 4 | PAPER SIZE: TRAY 1 | 26 |
| 5 | PAPER SIZE: TRAY 2 | A4 |
| 6 | PAPER SIZE: TRAY 3 | A0 |
| 7 | PAPER SIZE: LCT(TRAY 1) | 26 |
| 8 | PAPER SIZE: LCT(TRAY 2) | 26 |
| 9 | PAPER SIZE: LCT(TRAY 3) | 26 |
| 10 | CONFIGUARATION:ADF | 2 |
| 11 | CONFIGURATION:FINISHER | 1 |
| 12 | CONFIGURATION:PRINTER KIT | 1 |
| 13 | CONFIGURATION:SCANNER KIT | 1 |
| 14 | CONFIGURATION:LCT | 1 |

*FIG. 16A*

JAM HISTORY

| NO. | ITEM | RESULT |
|---|---|---|
| 1 | TOTAL PAPER JAMS | 0057 |
| 2 | TOTAL P.JAMS BY TRAY 1 | 0002 |
| 3 | TOTAL P.JAMS BY TRAY 2 | 0004 |
| 4 | TOTAL P.JAMS BY LCT(TRAY 3) | 0001 |
| 5 | TOTAL P.JAMS BY LCT EXIT | 0002 |
| 6 | TOTAL P.JAMS BY REGISTRATION | 0006 |
| 7 | TOTAL P.JAMS BY EXIT | 0005 |
| 8 | TOTAL ORIGINAL JAMS | 0079 |
| 9 | TOTAL P.JAMS BY DUP.ENTRANCE | 0005 |
| 10 | TOTAL P.JAMS BY DUP.TRANS.3 | 0001 |
| 11 | TOTAL P.JAMS BY INVERTER | 0006 |
| 12 | TOTAL P.JAMS BY FIN.ENTRANCE | 0005 |
| 13 | TOTAL P.JAMS BY FIN.EXIT | 0001 |
| 14 | TOTAL P.JAMS BY FIN.SHIFT T | 0006 |
| 15 | TOTAL P.JAMS BY FIN.STAPLE 1 | 0005 |
| 16 | TOTAL P.JAMS BY FIN.STAPLE 2 | 0007 |
| 17 | TOTAL P.JAMS BY FIN.STAPLE 3 | 0001 |
| 18 | TOTAL ORIG'L JAMS:ADF FEED | 0070 |
| 19 | TOTAL ORIG'L JAMS:ADF EXIT | 0009 |
| 20 | TOTAL P.JAMS BY LT(S) | 0048 |
| 21 | TOTAL P.JAMS BY OTHER SIZE | 0002 |
| 22 | TOTAL P.JAMS BY DLT | 0002 |
| 23 | TOTAL P.JAMS BY LG | 0001 |
| 24 | TOTAL P.JAMS BY LT(L) | 0004 |
| 25 | P.JAMS HISTORY:LATEST 0 | 232632616 |
| 26 | P.JAMS HISTORY:LATEST 1 | 232630278 |
| 27 | P.JAMS HISTORY:LATEST 2 | 282630277 |
| 28 | P.JAMS HISTORY:LATEST 3 | 692629913 |
| 29 | P.JAMS HISTORY:LATEST 4 | 162629488 |

| 30 | P.JAMS HISTORY:LATEST 5 | 282629120 |
|---|---|---|
| 31 | P.JAMS HISTORY:LATEST 6 | 692626033 |
| 32 | P.JAMS HISTORY:LATEST 7 | 352625442 |
| 33 | P.JAMS HISTORY:LATEST 8 | 290018214 |
| 34 | P.JAMS HISTORY:LATEST 9 | 292618213 |
| 35 | ORIG'l JAMS HISTORY: LATEST 0 | 032636226 |
| 36 | ORIG'l JAMS HISTORY: LATEST 1 | 032632102 |
| 37 | ORIG'l JAMS HISTORY: LATEST 2 | 032631464 |
| 38 | ORIG'l JAMS HISTORY: LATEST 3 | 032626880 |
| 39 | ORIG'l JAMS HISTORY: LATEST 4 | 040525489 |
| 40 | ORIG'l JAMS HISTORY: LATEST 5 | 030018781 |
| 41 | ORIG'l JAMS HISTORY: LATEST 6 | 032618694 |
| 42 | ORIG'l JAMS HISTORY: LATEST 7 | 032618667 |
| 43 | ORIG'l JAMS HISTORY: LATEST 8 | 032616667 |
| 44 | ORIG'l JAMS HISTORY: LATEST 9 | 032605030 |

―1740B

COUNTERS

| NO. | ITEM | RESULT |
|---|---|---|
| 1 | NO. OF SCANS | 0038125 |
| 2 | TOTAL COPY COUNTER | 00236302 |
| 3 | TOTAL PRINT COUNTER | 00105878 |
| 4 | NOT USED (GPC) | 00035303 |
| 5 | NOT USED (GPC) | 00035358 |
| 6 | TOTAL COPIES BY SIZE:LT(S) | 0128095 |
| 7 | TOTAL COPIES BY SIZE:OTHERS | 0000002 |
| 8 | TOTAL COPIES BY TRAY 1 | 0104700 |
| 9 | TOTAL COPIES BY TRAY 2 | 0001302 |
| 10 | TOTAL COPIES BY TRAY 3 | 0002667 |
| 11 | TOTAL COPIES BY TRAY 4 | 0003009 |
| 12 | TOTAL COPIES BY TRAY 5 | 0027878 |
| 13 | TOTAL COPIES BY TRAY 6 | 0060825 |

| | | |
|---|---|---|
| 14 | TOTAL COPIES BY SIZE:A3 | 0000013 |
| 15 | TOTAL COPIES BY SIZE:DLT | 0001484 |
| 16 | TOTAL COPIES BY SIZE:LG | 0000700 |
| 17 | TOTAL COPIES BY SIZE:LT(L) | 0000043 |
| 18 | TOTAL ADF COUNTER | 0033657 |
| 19 | STAPLE COUNTER | 010689 |
| 20 | PM COUNTER:COPY (SP7-617-01) | 0237921 |
| 21 | PM COUNTER:ADF (SP7-617-02) | 0030127 |
| 22 | PM ALARM COUNTER (SP7-803) | 0237 |
| 23 | :50%~99% | 0002950 |
| 24 | :FULL SIZE | 0126539 |
| 25 | :101%~200% | 0000409 |
| 26 | :201%~400% | 0000008 |
| 27 | :DIRECT MAG. | 0000004 |
| 28 | :SIZE MAG. | 0000427 |
| 29 | :FIXED MAG. | 0003367 |
| 30 | T. COPIES BY TEXT MODE | 0130010 |
| 31 | T. COPIES BY TEXT/PHOTO MODE | 0000002 |
| 32 | T. COPIES BY PHOTO MODE | 0000080 |
| 33 | T. COPIES BY GENERATION MODE | 0000044 |
| 34 | T. COPIES BY PALE MODE | 0000201 |
| 35 | T. COPIES BY PUNCH | 0002947 |
| 36 | T. COPIES BY SORT | 0101360 |
| 37 | T. COPIES BY STAPLE | 0073731 |
| 38 | T. COPIES BY SERIES | 0000200 |
| 39 | T/C BY MULTIPLE COPY :1 TO 1 | 0006293 |
| 40 | :1 TO 2~5 | 0000923 |
| 41 | :1 TO 6~10 | 0000757 |
| 42 | :1 TO 11~20 | 0000130 |
| 43 | :1 TO 21~50 | 0000080 |
| 44 | :1 TO 51~100 | 0000026 |

| 45 | :1 TO 101~300 | 0000011 |
|---|---|---|
| 46 | :1 TO 300~ | 0000006 |
| 47 | T.COPIES BY DUPLEX COPY | 0037858 |
| 48 | T.COPIES BY ADF | 0000043 |
| 49 | T.COPIES BY 2-SIDE ORIGINAL | 0020899 |
| 50 | T.COPIES BY INTERRUPT | 0000360 |
| 51 | T.COPIES BY COMBINE-1SIDE | 0000069 |
| 52 | T.COPIES BY COMBINE-2SIDE | 0000070 |
| 53 | T.COPIES BY BOOKLET MODE | 0000004 |
| 54 | T.COPIES BY MAGAZINE MODE | 0000010 |
| 55 | T.COPIES BY PAGE NUMBERING | 0000030 |

—1750C

OPERATION TIME

| NO. | ITEM | RESULT |
|---|---|---|
| 1 | OPERATION TIME(MIN.) | 0078 |
| 2 | PM PARTS LEVEL:DEVELOPER | 6 |
| 3 | (PM):OIL SUPPLY/CLEANING WEB | 7 |
| 4 | (PM):WEB CLEANING ROLLER | 3 |
| 5 | (PM):PRESSURE ROLLER | 3 |
| 6 | (PM):PR CLEANING ROLLER | 3 |
| 7 | (PM):HR STRIPPER | 3 |
| 8 | (PM):DEV. FILTER | 7 |
| 9 | (PM):TONER FILTER(CENTER) | 5 |
| 10 | (PM):TONER FILTER (FRONT) | 5 |
| 11 | (PM):1ST FEED ROLLER | 3 |
| 12 | (PM):1ST PICK-UP ROLLER | 3 |
| 13 | (PM): 1ST SEP. ROLLER | 3 |
| 14 | (PM):TRANSFER BELT | 5 |
| 15 | (PM):TRSF BELT C. BLADE | 5 |
| 16 | (PM):DUST FILTER | 7 |
| 17 | (PM):CLEANING BLADE | 7 |
| 18 | (PM): CLEANING BRUSH | 7 |

| 19 | (PM):GRID PLATE | 6 |
| 20 | (PM):CHARGE CORONA WIRE | 6 |
| 21 | (PM):WIRE CLEANER | 6 |
| 22 | (PM):CUSHION C. CORONA WIRE | 6 |
| 23 | (PM):PICK-OFF PAWLS | 6 |
| 24 | (PM):ADF TRANSPORT BELT | 3 |
| 25 | (PM):ADF SEPARATION ROLLER | 3 |
| 26 | (PM):ADF FEED BELT | 3 |
| 27 | (PM):ADF PICK-UP ROLLER | 3 |
| 28 | (PM):LCT 3RD FEED ROLLER | 2 |
| 29 | (PM):LCT 3RD PICK-UP ROLLER | 2 |
| 30 | (PM):LCT 3RD SEP. ROLLER | 2 |
| 31 | (PM):RESERVED AREA 1 | Z |
| 32 | (PM):RESERVED AREA 2 | Z |
| 33 | (PM):RESERVED AREA 3 | Z |

SC HISTORY

| NO. | ITEM | RESULT |
|---|---|---|
| 1 | TOTAL SC COUNTER | 0021 |
| 2 | NO. OF SC310 | 01 |
| 3 | NO. OF SC312 | 01 |
| 4 | NO. OF SC321 | 01 |
| 5 | NO. OF SC352 | 01 |
| 6 | NO. OF SC630 | 07 |
| 7 | NO. OF SC640 | 03 |
| 8 | NO. OF SC643 | 02 |
| 9 | NO. OF SC738 | 02 |
| 10 | NO. OF SC990 | 03 |

SENSOR OUTPUT, ROM VER. ETC

| NO. | ITEM | RESULT |
|---|---|---|
| 1 | NO. OF REGISTERED PROGRAM | 00 |
| 2 | FUSING TEMPERATURE(C) | 174 |
| 3 | TD SENSOR OUTPUT:VT | 2.09 |
| 4 | ID SENSOR OUTPUT:VSG | 4.05 |
| 5 | ID SENSOR OUTPUT:VSP | 0.41 |
| 6 | APS SENSOR OUTPUT DISPLAY | 00000000 |
| 7 | HDD1 BAD SECTER:TOTAL | 00 |
| 8 | HDD1 BAD SECTER:COPY | 00 |
| 9 | HDD1 BAD SECTER:PRINTER | 00 |
| 10 | HDD1 BAD SECTER:COPY SERVER | 00 |
| 11 | HDD2 BAD SECTER:TOTAL | 00 |
| 12 | HDD2 BAD SECTER:COPY | 00 |
| 13 | HDD2 BAD SECTER:PRINTER | 00 |
| 14 | HDD2 BAD SECTER:COPY SERVER | 00 |
| 15 | ROM VERSION:SICU | A2945604P |
| 16 | ROM VERSION:BCU | A2945264P |
| 17 | ROM VERSION:CONCORDE(PI) | A2325372C |
| 18 | ROM VERSION:HDC | A2945144 |
| 19 | ROM VERSION:SCANNER | A2945057C |
| 20 | ROM VERSION:ADF | B3015562D |
| 21 | ROM VERSION:FINISHER | B3025103G |
| 22 | NOT USED(ROM VERSION:RMC) | B3275141 |
| 23 | ROM VERSION:PRINTER | |

— 1780A

COPY COUNTER BY USER CODE

| NO. | ITEM | RESULT |
|---|---|---|

— 1790

NOT USED

| NO. | ITEM | RESULT |
|---|---|---|

— 1792

ALARM INFO.

| NO. | ITEM | RESULT |
|---|---|---|

— 1794

SC INFO.

| NO. | ITEM | RESULT |
|---|---|---|

— 1796

READ/WRITE CHANGE INFO.

| NO. | ITEM | RESULT |
|---|---|---|

CUSTOMER INFORMATION                                    1800

| CUSTOMER | |
|---|---|
| DIVISION/DEPARTMENT/SECTION | |
| COPIER ADMINISTRATION | |
| ADDRESS | |
| CITY/STATE/ZIP/COUNTRY | |

1810

L-ADP INFORMATION

| S/N PREFIX AND SERIAL NUMBER | A755 | | |
|---|---|---|---|
| L-ADP PHONE NUMBER | | | |
| DAILING INFO | DIAL TYPE | ○ TONE   ○ PULSE(20PPS)   ○ PULSE(10PPS) | |
| | REDIALING | REGISTER: 9,18007426449   REDIAL INTERVAL TIME: 60   REDIAL FREQUENCY: 2 | |

COPIER 0 INFORMATION

| S/N PREFIX AND SERIAL NUMBER | | | DEVICE CODE: | 0 |
|---|---|---|---|---|
| INSTALLED SECTION | | | FLOOR: | |
| TAG ID | | | | |
| CONTACT | | ☐ | TEL: | |
| SO/SD | SO: | ☐ ☐ | SD: | |
| M/R DATE | | | | |
| PARTICULAR NOTES | | | | |
| M/R INFORMATION | | | | |
| INSTALLATION DATE | | | | |

— 1830

• • •

COPIER N INFORMATION

| S/N PREFIX AND SERIAL NUMBER | | | DEVICE CODE: | 1 |
|---|---|---|---|---|
| INSTALLED SECTION | | | FLOOR: | |
| TAG ID | | | | |
| CONTACT | | ☐ | TEL: | |
| SO/SD | SO: | ☐ ☐ | SD: | |
| M/R DATE | | | | |

*FIG. 17B*

METHOD AND SYSTEM OF REMOTE MONITORING OF IMAGE FORMING APPARATUS

CROSS-REFERENCE TO RELATED APPLICATION

The present application is related to U.S. Provisional Patent Application No. 60/330,813 filed Oct. 31, 2001, entitled "Method and System of Remote Monitoring of Image Forming Apparatus."

BACKGROUND OF THE INVENTION

1. Field of the Invention

The invention generally relates to a method and apparatus for remotely monitoring an image forming apparatus or other apparatus. More particularly, the invention relates to evaluating machine conditions and transmitting information based on the conditions.

2. Discussion of the Background

Image forming machines such as copiers, facsimile machines, and printers experience operational problems. When operational problems arise, a dealer will typically provide repair products and services to the customer. Maintenance and repairs are managed and provided by the dealer who purchases the machine from manufacturers and who then sells the machine to the customer. Unfortunately, in such a marketplace, it is difficult for manufacturers to obtain information about machine conditions during the machine's operational lifetime. The inventors of the present invention recognized that it would be advantageous to have an image forming machine monitoring system and method which remotely monitor the image forming machines.

SUMMARY OF THE INVENTION

Accordingly, it is an object of the invention to provide a method and system for remote monitoring and/or controlling of machines, such as but not limited to, image forming machines.

This and other objects are accomplished by a method and system in which machine data is transmitted from the image machine to a remote monitoring system for evaluation. The current machine data may be of any type related to the image machine, including, for example, paper jams, paper usage, energy usage, functionality of device components and usage frequency, although other types of data may be utilized. The evaluation of the current machine data includes comparing the current machine condition data to determine possible sources that are causing the operating problem. The remote monitoring system may respond to the operating problem by adjusting the image machine, sending a notification to a dealer's help desk and to a dispatcher. The image machine may be of any type of electronically controllable device that produces images, including, for example, printers, copiers, facsimile machines, and digital cameras.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIGS. 4A.1 and 4A.2 illustrates an alternate embodiment of a data flow diagram of communication, during a service call which requires dispatching of a technician, among the customer system, remote monitoring system, helpdesk and dispatch system of FIG. 3;

FIGS. 4B.1 and 4B.2 illustrates an alternate embodiment of a data flow diagram of communication, during an automatic call, among the customer system, remote monitoring system, helpdesk and dispatch system of FIG. 3;

FIGS. 4C.1 and 4C.2 illustrates an alternate embodiment of a data flow diagram of communication, during a customer call, among the customer system, remote monitoring system, helpdesk and dispatch system of FIG. 3;

FIGS. 4D.1 and 4D.2 illustrates an alternate embodiment of a data flow diagram of communication, during a manual call, among the customer system, remote monitoring system, helpdesk and dispatch system of FIG. 3;

FIG. 8A illustrates an exemplary e-mail message for a critical service call;

FIG. 8B illustrates an alternate exemplary e-mail message;

FIG. 13 is an exemplary call list;

FIG. 14A is an exemplary call detail;

FIGS. 14B and 14C are an exemplary service call and jam data;

FIGS. 15A to 15K are an exemplary read/write screen including read/write machine data;

FIGS. 16A to 16G are exemplary machine condition data during operation; and

FIGS. 17A and 17B are exemplary machine identification information for a customer.

DESCRIPTION OF THE PREFERRED EMBODIMENTS

Figure 1:
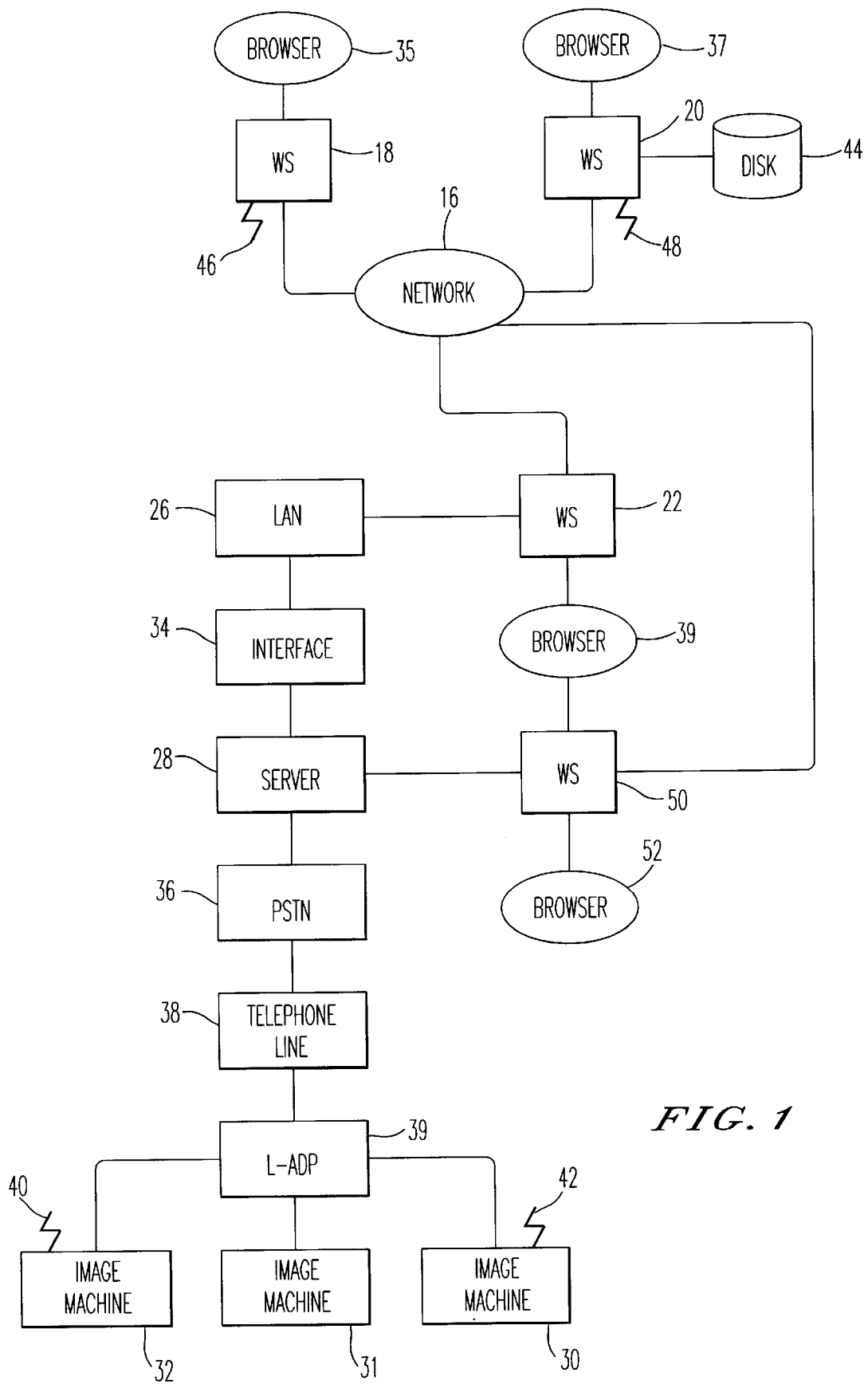
FIG. 1 illustrates a block diagram of three networked image forming machines connected to a network of computers and databases through a telephone line and a network.

Referring now to the drawings, wherein like numerals designate identical or corresponding parts throughout the several views, and more particularly to FIG. 1 thereof, there is illustrated a figure showing various machines and computers forming a system for monitoring, diagnosing and controlling the operation of the machines. The present invention can be used with JP2001-136192, which corresponds to Ser. No. 09/408,443 entitled METHOD AND SYSTEM FOR REMOTE DIAGNOSTIC, CONTROL, AND INFORMATION COLLECTION BASED UPON THE CONNECTION OR CONNECTIONLESS COMMUNICATION METHOD SENDING MESSAGES TO THE RESOURCE MANAGER, which is incorporated herein by reference. In FIG. 1, there is a first network 16, such as the Internet connected to computer workstations (WS) 18, 20 and 22. The workstations may be of any type of computer including IBM Personal Computer compatible devices, Unix based computers or Apple Macintosh computers. Connected to the network 16 is a Local Area Network ("LAN"); however, it should be appreciated that any number of additional networks capable of connecting to networks, various machines or computers may be included in the system. Also connected to the network 16 is a server 28 and workstations (WS) 18, 20 and 22.

Server 28 is connected to the network 16 via the LAN 26, an interface 34 and workstation 22. Alternatively, server 28 may be connected directly to the network 16. Server 28 is also connected to image machines 30, 31 and 32 via a PSTN 36, a telephone line 38 and a line-adapter/multiplexer (L-ADP) 39. Images machines 30, 31 and 32 may be digital copiers/printers, facsimile machines, printers postage machines, multi-function image machines, or any other type of machine or device that displays or generates images or data, whether it be done on a printer medium or an electronic display. The image machines may be used as the machines or monitored devices. Although three image machines are shown as supported by the L-ADP, it should be appreciated that any number of image machines or monitored devices may be supported by each L-ADP. For example, up to 5 copiers or more may be supported by the L-ADP.

Additionally, a facsimile server (not illustrated) may be connected to server 28 and have a telephone, Integrated Services Digital Network (ISDN), wireless or cable connection. The image machines 30, 31 and 32 may also include connections 40 and 42, respectively, which may be conventional telephone, ISDN and/or cable. The image machines 30, 31 and 32 communicate with remote monitoring, diagnosis and server 28 via the direct telephone line, ISDN, wireless or cable connection. Server 28 may also be connected to a workstation 50 with a browser 52.

In FIG. 1, the network 16 includes a plurality of interconnected computers and routers (not shown). The manner of communicating over a network is known through Request for Comments ("RFC") documents obtained by file transfer protocol ("FTP") at NIC.DDN.MIL or at FTP.NISC.SRI.COM. Transmission Control Protocol/Internet Protocol ("TCP/IP") related communication is described for example in the book "TCP/IP Illustrated," Vol. 1, The Protocols, by Stevens, from Addison-Wesley Publishing Company, 1994, which is incorporated herein by reference.

Workstations 18, 20, 22 are connected to network 16 and are located remotely from each other and other machines; however, it should be appreciated that any of the workstations may be locally located to each other or any of the machines. Workstations 18, 20, 22 include browsers 35, 37, 39 which allow obtaining and transmitting information over network 16. Workstation 20 includes a disk 44 which may be shared using proper encryption and protocols over the network with other workstations connected to the network or in communication with workstation 20. It should be appreciated that although only one workstation 20 is illustrated as including a disk 44, any workstations may include a disk for storing information. The disks used to store databases are a non-volatile memory such as a hard disk or optical disk. Alternatively, the databases may be stored in any storage device, including but not limited to, solid state and/or semiconductor memory devices. Disk 44 includes dispatch data; however, any number of databases or types of information may be stored thereon. Dispatch data is information related to service technicians, such as but not limited to, whether a dispatcher or service technician has been called for a particular call or machine notification, service technician contact information, including but not limited to service technician e-mail addresses, numeric and alphanumeric pagers numbers and telephone numbers. Workstations 18, 20 and 22 are exemplary of computers which are uses by dealers and/or service repair entities.

Workstation 50 is connected to the server 28 and allows access to the information transmitted to and/or stored at server 28, and may be provided with at least as much information and capability as workstation 18, 20 and 22.

In addition to the workstations 18, 20, 22 being connected to network 16, the workstations may also include connections 46, 48 to a telephone line, ISDN, DSL, ADSL, cable or any other appropriate connection which provides a secure connection to the machine which is monitored, diagnosed and/or controlled. Connections 46, 48 may provide automatic alternative communication among the network, telephone line, ISDN or cable, if any one connection is not operating properly.

Workstation 22 is coupled between the server 28 and the network 16. Workstation 18 and 20 are coupled to the network. Workstation 18 is exemplary of a workstation a helpdesk utilizes. Workstation 20 is exemplary of a workstation which a dispatcher would use. Workstation 22 is exemplary of a workstation a dealer or service organization would use. The workstation 22 may transmit information related to image machines 30, 32 to/from the network 16 and to/from server 28. Additionally, workstation 24 includes a browser 39 so that data may be viewed and so that a read and write capability is available. The read and write capability allows a user to view information presented on the browser 39 and also to modify it as necessary. Thus, information may not only be received, but also data may be entered and transmitted to the image machines 30, 31 and 32, server 28 or any other workstations, machines and devices in the system.

Figure 2:
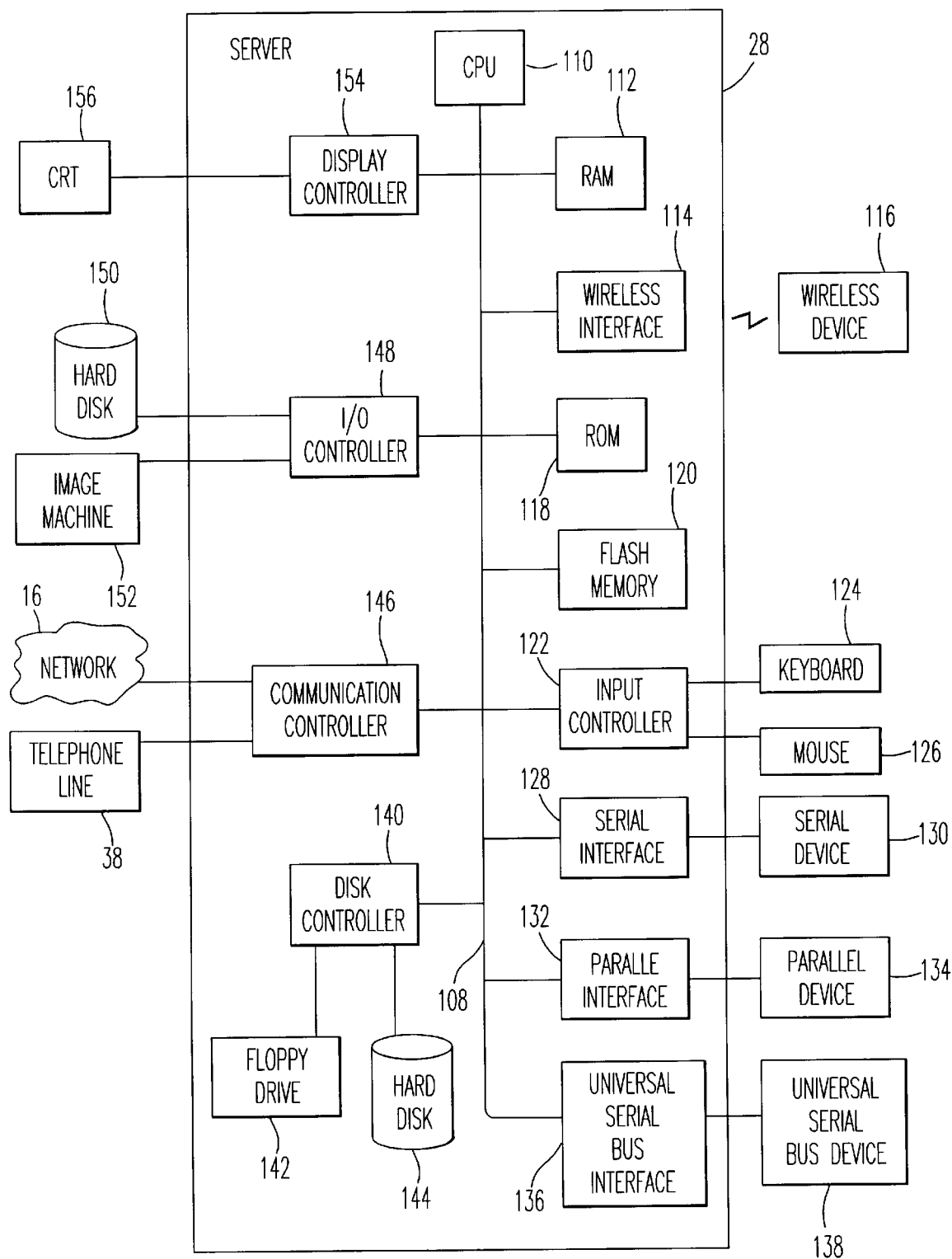
FIG. 2 illustrates a block diagram of an exemplary computer which monitors machine conditions and which communicates with the image forming machines and computers.

FIG. 2 illustrates the server 28 of the present invention including a CPU 110 which may be implemented as any type of processor including commercially available microprocessors from companies such as Intel, Motorola, Hitachi and NEC, for example. The various elements of the server 28 are connected by a system bus 108.

A working memory such as a RAM 112, a wireless interface 114 which communicates with a wireless device 116 is included in server 28. The communication between interface 114 and device 116 may use any wireless medium such as radio waves or light waves, for example. The radio waves may be implemented using a spread spectrum technique such as Code Division Multiple Access ("CDMA") communication or using frequency hopping techniques, or any other transmission method.

A non-volatile memory, such as a ROM 118 and/or a flash memory 120, for example, an EPROM or EEPROM may be used to store instruction that the CPU 110 executes, for example. An input controller 122 has connected thereto a keyboard 124 and a mouse 126. Additionally, a serial interface 128 coupled to a serial device 130, a parallel interface 132 coupled to a parallel device 134, and a universal serial bus interface 136 coupled to a universal serial bus device 138 is included in server 28.

With a continued reference to FIG. 2, a disk controller is coupled to a floppy drive 142 and a hard disk 144. A communication controller 146 is coupled to with network 16 and telephone 38. An I/O (input/output) controller 148 is coupled to hard disk 150 and image machine 152. It should be appreciated that any number of image machines may be coupled to controller 148. A display controller 154 connected to CRT (Cathode Ray Tube) 414 is included in server 28, although an LDC display, plasma display, or any other type of display may be utilized. Server 28 is exemplary of a computer which may be used as a remote monitoring system for a manufacturer of machines and any other type of computer, peripherals, etc. maybe used.

Figure 3:
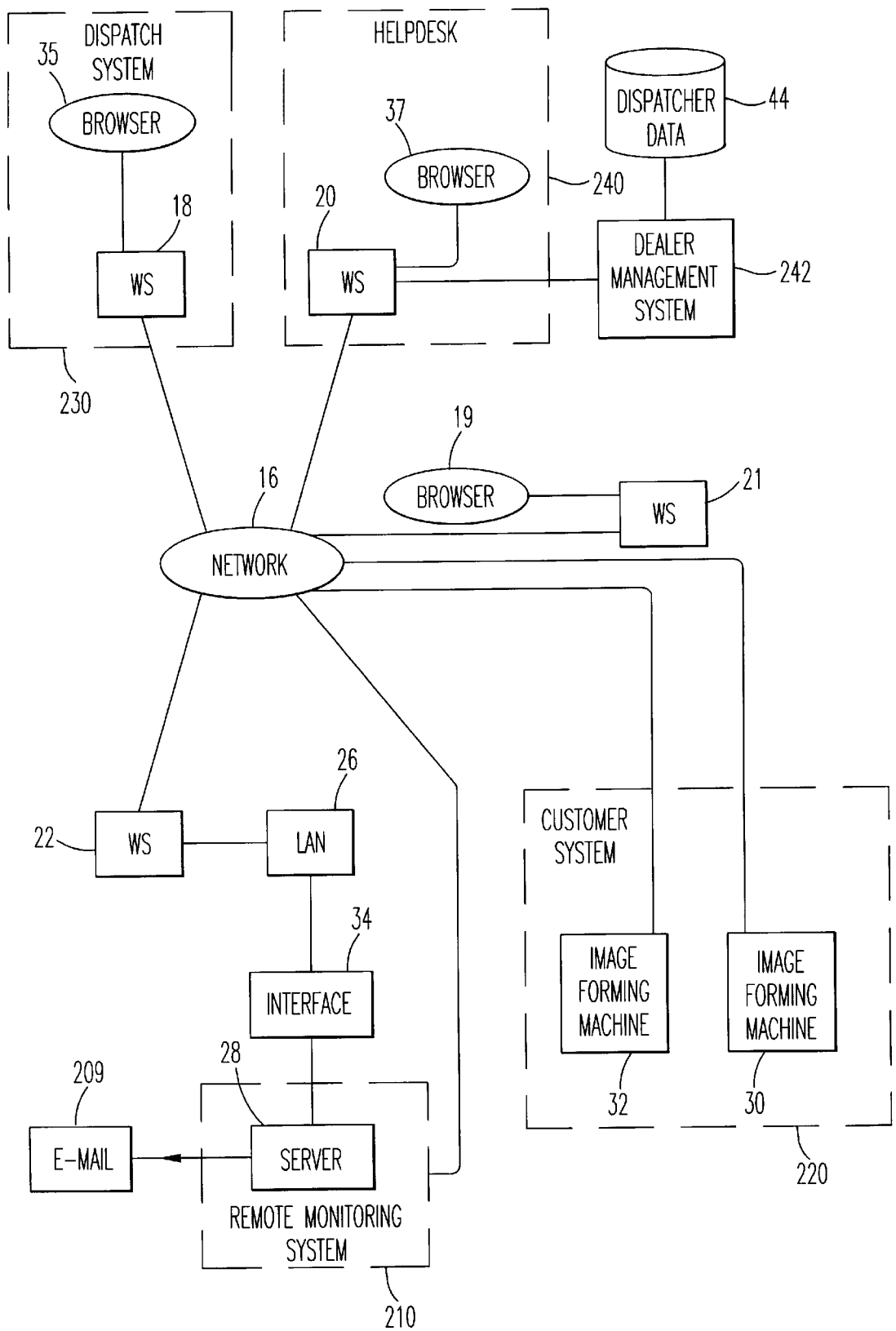
FIG. 3 illustrates a block diagram of a network with a remote monitoring server, dispatch system, helpdesk and customer system connected to a network.

FIG. 3 illustrates an alternate implementation of monitoring, diagnosing and controlling the operation of machines. This implementation may use the same or different type of components, computers, and networks as previously described. FIG. 3 includes a remote monitoring system (RMS) server 210, a customer system 220, a dispatch system 230 and a help desk 240 coupled to network 16. The arrangement of FIG. 3 allows one system to monitor, diagnose and control various machines at remote locations. The RMS server 210 monitors, diagnoses and controls the images machines in customer system 220 and provides access to information related to the image machines to workstation 18, 20, 21 and 22. Although one customer system 220 is shown, it should be appreciated that any number of remotely located customer systems may be in communication with remote monitoring system 210. Also, the dispatch system 230 and the help desk 240 are in communication with remote monitoring system 210 and are capable of transmitting and receiving information. The dispatch system 230 and the help desk 240 may be located remotely or locally to each other. The help desk and also the dispatcher may be a dealer of machines.

Remote monitoring system 210 includes server 28 which is connected to a network 16 via the LAN 26 and the interface 24. Remote monitoring system 210 includes email 209 which are sent to the help desk 240 and/or dispatch system 230 and include image machine information such as a tag ID number. Customer system 220 is coupled to network 16. Customer system 220 includes image forming machines 30, 32; however it should be appreciated that additional machines may be provided. The dispatch system 230 and the help desk 240 include workstations 18, 20, respectively. The dispatch system 230 and the help desk 240 may be located remotely as separate systems or may be combined as one system.

Workstations 18 and 20 include browsers 35 and 37, respectively. Each browser provides display of data including, machine condition data which is real-time data related to the monitored machines or image forming machines 32, 30, to each user at the workstation. In the one embodiment, data may be viewed over the network 16 and does not have to be downloaded from the remote monitoring system 210. This viewing feature is beneficial because data may be accessed easily and quickly. Help desk 240 may be associated with a dealer which sold the machine to the customer. The help desk assists in ascertaining and solving the problem related to machine notification. The dispatcher provides information related to dispatching a service technician.

A dealer management system 242 may be connected, for example, to the workstation 20 at the helpdesk 240. The dealer management system 242 may include product and service information, such as, but not limited to, supply order status, product usage status and service dispatch status. The information may be acquired via the network 16 using a managing application for machine dealers. One exemplary asset managing application is enterprise resource planning system which is described below with reference to FIG. 4B at step 422. A dispatch database 44 is coupled to dealer management system. Dispatch system 230 may be connected to dealer management system 242.

A remote workstation 21 coupled to a browser 19 may be connected to the network 16 to allow additional helpdesks, dispatchers, customers or other appropriate entities to view information and to assist in controlling the system.

During monitoring, diagnosing and controlling operation of the machines, various information is transmitted and received by the remote monitoring system 210, the customer system 220, the dispatch system 230 and the help desk 240. FIGS. 4A, 4B, 4C and 4D illustrate the process of information transmitting and receiving during a machine notification or call request related to the image machine. A machine notification or call request is a transmitted signal from the image forming machine if a potential problem is realized.

FIG. 4A illustrates a response process to a call or machine notification which is indicative of potential problems with the machine. The exemplary call is a service call with a request for a service technician dispatch and checking the machine condition. It should be appreciated that other types of call may be transmitted, for example, but not limited to, a manual call and a customer call. The service call includes, for example, fixing errors which are related to the hardware of the image machine, for example, "fusing thermistor open," "fusing temperature warming-up error," and "fusing overheat error" are indicative that the problem related to fusing and a replacement part may be required. A service repair person may be dispatched to fix the machine at the customer site. Alternatively, the machine conditions may be checked remotely to determine the problem. For example, a manufacturer may remotely modify software to improve fusing.

With a continued reference to FIGS. 4A.1 and 4A.2, step 310 a service call ("SC") occurs and is transmitted from the image machine to the RMS center where at step 312 the service call is received. The service call includes an identifier, such as, but not limited to a tag ID number which unique for every image machine or monitored machine which communicates with the center. At step 314, an e-mail message is sent. The e-mail message may be determined based on a unique identifier or other appropriate image machine identifying information. At step 316, the e-mail message is received by the help desk. The help desk includes a RMS client and a dispatch system which may be located either remotely or locally to each other. At the dispatch system, step 318 receives a request to check if a technician was already dispatched. At determination step 320, the dispatch system determines whether the technician was already dispatched. The determination that the technician was already dispatched is based on using the tag ID number provided in the e-mail message to search on the dispatch system at block 328. If the technician was already dispatched, then the help desk transmits a request at step 322 to close the service call.

If the technician was not already dispatched, then at step 324 the help desk opens the call list using the information of the e-mail message to search at the call list at block 326. The call list is described below with reference to FIG. 13. At step 330, the help desk checks the image machine condition. At determination step 332, the help desk determines if the copier is already reset, and therefore indicative that no problem is pending or that servicing has been initiated. If the image machine is already reset, then at step 334 the helpdesk closes the service call. If the service call is not reset, then at step 336 the service call is reset.

At step 338, the help desk checks the image machine or copier condition. The image machine condition is checked by activating a read and write capability via a Read/Write menu which is described below with reference to FIGS. 15A–I. The instruction to upload the current machine parameters is transmitted from the workstation to the image machine through the RMS server and the telephone line. The current machine parameters are uploaded to the RMS server. The operator at the helpdesk can monitor the uploaded parameters by using the browser which is installed in the workstation, as shown in FIG. 1. The number of current machine parameters which represent the copier condition may be numerous, and therefore difficult for the operator to identify the copier problem. In order to resolve the difficulty in analyzing the information, the current machine condition parameters may be compared to the reference parameters at the RSM server.

During read and write activation, a parameter acquiring device in the RMS server requests to upload the parameters to the LADP, and the LADP requests to upload the current machine parameters which are related to the copier or image machine designated on the call list menu described below with reference to FIG. 13. The uploaded current machine parameters are stored in the memory in the RMS server. A comparing device compares the current machine parameters and the reference parameters. The read/write menu may allow an operator to select current machine parameters for uploading. For example, changed parameters may be selected for uploading because only changed parameters will be updated. Parameters that are not changed do not have to be uploaded.

At determination step 340, the help desk checks if the machine was reset. If the machine was reset, then at step 336 the help desk closes the service call. If the machine was not reset, then at step 344 the dispatch system dispatches a technician, and at step 336 closes the service call.

If the service call or any other call, such as a customer call, or manual call occurs, event notification is transmitted from the copier to the RMS server through the public phone line. By using the public phone line, the event notification is transmitted to the RMS server securely, although other transmission means, such as Internet may be used. If the Internet is used, encryption may be used, if desired. If the RMS server receives the call notification, it sends e-mail to an appropriate entity(s) that can resolve the problem related to the copier and/or to dispatch the service technician. Consequently, timely information reaches the appropriate entities because the notification is made via e-mail. Also, the current machine information and the reference parameters are updated and provided by the RMS server. The helpdesk, dispatcher or other entity can view detailed information regarding the copier condition from a workstation through the Internet or other appropriate network.

FIGS. 4B.1 and 4B.2 illustrate a response process to a service call with a request for a service technician dispatch and the checking of the machine condition. The service call includes but is not limited to issues related to "SC310 & 312: photoconductive drum potential sensor error", "SC321: laser writing error", "SC352: image density sensor error", "SC630: Communication error between LADP and RMS server", "SC640&643: communication error caused by electric board", "SC738: finisher shift-tray lift motor error" and "SC990: software performance error."

At step 410 a service call occurs. The service call is automatically activated by the image machine because there is a problem with the machine which is not easily fixed by the customer and which is critical because it may involve hardware repairs. The service call is transmitted from the copier to the RMS server through the public phone line. When the service call is transmitted, the machine condition data 409 and the service call and jam data 411 are also transmitted from the copier to the RMS server via the phone line. At step 412, the service call is received by the RMS server. The RMS server checks a table in which the e-mail address of the sales dealer (SO) is determined based on the copier identification, such as the tag ID number. The tag ID number is a number which uniquely identifies a copy machine and particular information associated with the copier, such as that described with reference to FIG. 17. At step 414, the RMS server sends two e-mails. However, it should be appreciated that any number of e-mail may be sent to notify appropriate entities such as dealers (help desk), service repair technicians or customers. The e-mails are sent to the helpdesk and the dispatcher. The first e-mail is send to the helpdesk. However, the additional e-mail is sent to the dispatcher based on the type of service call which may require hardware adjustments or replacements, and therefore require a technician. FIGS. 5, 6, 7 and 8 describe the devices and process of e-mails sent to and from the RMS server.

Referring again to FIGS. 4B.1 and 4B.2, step 416 receives e-mail at the helpdesk. The e-mail may include the tag ID number and the type of machine notification which are capable of obtaining other data related to the machine problem Step 420 checks if a technician was already dispatched based on the dispatch database 420a which located at the dispatch system. Block 422 indicates that dispatching of a technician is determined by using the tag ID transmitted in the e-mail message to search on an enterprise resource planning (ERP) system or other appropriate management system. An ERP assists a manufacturer or other business to manage the important parts of its business, including product planning, parts purchasing, maintaining inventories, interacting with suppliers, providing customer service, and tracking orders. ERP can also include application modules for the finance and human resources aspects of a business. An ERP system uses or is integrated with a relational database system. The OMD is an application which manages, inventor, service and products, for example, but not limited to, the copier installation, billing, supply order information, product usage information and service dispatch information. Step 424 determines if the technician has been dispatched. If the service technician has already been dispatched, step 426 closes the service call using the information of the e-mail message to search the call list. For example, the tag ID number may assist in uniquely identifying the information. If the service technician has not been dispatched, step 430 dispatches a technician. Block 432 indicates that dispatching of a technician is based on using the tag ID transmitted in the e-mail message to search on OMD. Step 434 closes the service call.

FIGS. 4C.1 and 4C.2 illustrate a response process to a customer call (CC) with a request for a service technician dispatch. The customer call transmits a machine notification to the customer. At step 510 a customer call occurs. The customer call includes but is not limited to "door open for a predetermined period of time" and "jam occurrence frequently at the same position of the paper feed path." The customer call is activated by a potential machine problem which occurs based on certain conditions, including, but not limited to, a duration of time and quantity. At step 512, the customer call is received by the RMS server. The customer call is transmitted from the copier to the RMS server through the public phone line. When the customer call is transmitted, machine condition data 511 and SC and Jam data report 513 are also transmitted from the copier to the RMS server via the telephone line. If the RMS server receives the customer call, the RMS server checks a table to determine e-mail addresses based on the tag ID number. Step 514 sends e-mail to the helpdesk to notify the customer call is activated.

At step 516, the message is received by the helpdesk. Step 518 checks if service technician was already dispatched. Step 520 determines if a technician is already dispatched. If the service technician has already been dispatched, step 522 step closes the customer call and no further action will be made. If the service technician has not been already dispatched, step 527 opens a browser. Step 528 opens the call list, described below with reference to FIG. 13, to see the copier information related to the customer call occurs. The call list may be displayed on the browser. Alternatively, a separate application may display the call list. Step 530 checks the copier condition. The checking of the copier condition is explained above with reference to FIG. 4A, step 338, and is applicable for step 530.

Step 532 determines if the image machine was already set. If the machine has been already reset, step 534 closes the customer call. If the machine has not been reset, then step 536 calls the customer to inquire about the problem. Step 538 requests to fix the problem with the customer's advice. The customer may assist with fixing by answering questions, adjusting the copier hardware and software, or providing supplies such as toner or paper to the machine. The helpdesk also may change the parameters based on the response from the customer. Step 540 determines whether the problem is fixed. The helpdesk may ask the customer if the problem has been fixed: If the problem is fixed, then step 542 closes the customer call. If the problem is not fixed, then step 544 dispatches a technician. Step 546 closes the customer call.

FIGS. 4D.1 and 4D.2 illustrate a response process to a manual call with a request for a service technician dispatch and checking the machine condition. At step 610, a manual call occurs. The manual call is activated when a customer enters the sequential keystrokes on an operation panel of the copier, and the manual call may be transmitted to the RSM server through the telephone line. When the manual call is transmitted, machine condition data 611 and manual call and jam data 613 are also transmitted from the copier to the RMS server via LADP. A controller of the RSM server checks the data table in which the tag ID and the service organization (SO)/service dealer (SD) are stored in order to find an appropriate dealer and/or help desk. The service organization may be associated with multiple service dealers. If the RSM server can find the appropriate helpdesk, the RSM server automatically sends e-mail to the help desk. The sample of the e-mail that is sent to the helpdesk is shown in FIG. 8B. In the RSM server, the e-mail address of each helpdesk is stored, and if the RSM server finds the appropriate helpdesk, automatically the helpdesk e-mail is sent. The e-mail function is described with reference to FIGS. 5, 6 and 7.

At step 616, the e-mail is received at the help desk. Step 618 opens the call list to see the copier information related to the manual call, using the subject and contents of the e-mail message to search the call list at block 620. Step 622 checks the copier condition. The checking of the copier condition is described with reference to FIG. 4A. Step 623 uses the browser to check the copier condition. The call list, described with reference to FIG. 13, is used and the SEQ number is activated by an operator such that the call detail described with reference to FIG. 14A, is opened. By activating the machine condition data menu, the machine condition data screen is displayed on to an operator at the helpdesk. By viewing parameters and related data on this screen, the operator at the help desk knows the LADP/Copier Information and the condition of the copier. The operator may determine the problems of the copier by analyzing the parameters. Step 624 calls the customer to ask the problem.

At step 622, the copier condition is checked. The checking of the copier condition is explained above with reference to FIG. 4A, step 338, and is applicable for step 622. The operator may determine the problems and/or solutions of the copier by studying the parameters. Step 624 calls the customer to inquire about assisting with resolving the problem. Calling the customer uses LADP/Copier Information at manual call detail at block 626.

Step 628 attempts to resolve the problem. As the operator has estimated the problems of the copier, the operator may ask questions. Alternatively, the operator may attempt to solve the problem by changing the parameters based on the response from the customer. Step 630 determines if the problem is solved. If the problem is solved, then step 632 closes the manual call. If the problem is not solved, step 634 dispatches a technician using the tag ID of the subject of the e-mail message to search on the dispatch system at block 636.

Figure 5A:
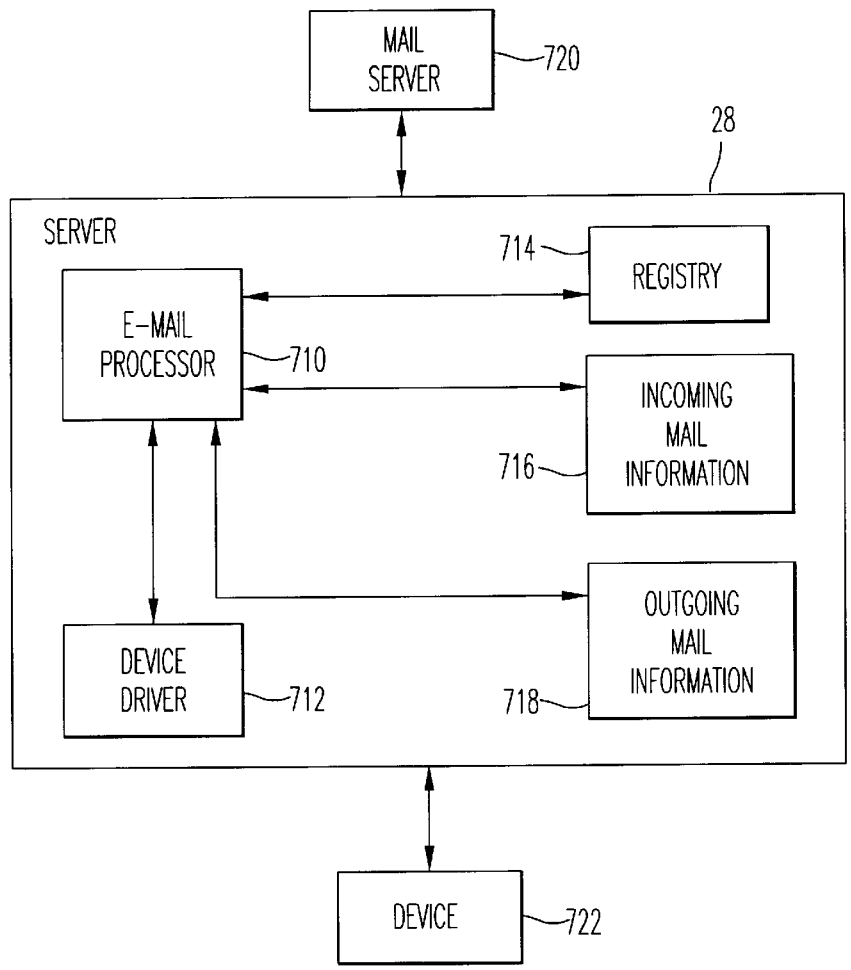
FIG. 5A illustrates a block diagram of e-mail related modules, objects and information which are located in a server.

FIG. 5A illustrates various objects such as software objects and modules contained within the server 28. The server 28 is connected to a mail server 720 through which mail is sent and received. The mail server 720 may be located at an Internet service provider (not shown), may be located on a network, may be owned by the company owning the server 28, or may even be located inside of the server 28 360, for example. An e-mail processor 710 is utilized to control the transmitting and receiving of electronic mail messages. The e-mail processor may be implemented in any desired or known manner and may be based on commercially available electronic mail programs such as Microsoft's Outlook Express, or GroupWise by Novell, although any other e-mail program may be used, if desired. As a specific implementation, the e-mail system may retrieve e-mail from the server using POP3 (Post Office Protocol) and to access the e-mail server in order to send e-mails using SMTP (Simple Mail Transfer Protocol), although any other protocol may be used, if desired. If the computer 360 utilizes an operating system such as an operating system for Unix, then the computer will usually have an IP address and a mail system built-in. Therefore, there may be no need to utilize the mail server 720 with such a system. A registry 714 contains various information of the system and may be implemented in the same or similar manner as the registry of Windows 95, Windows 98, and/or Windows NT, for example. Incoming mail information 716 maybe utilized to store incoming mail. Additionally, if desired the incoming mail information 716 may be implemented to store the POP3 location, and store file information about the incoming e-mails. Outgoing mail information 718 contains information regarding SMTP and file information for outgoing mail. A device driver 712, such as a printer driver, scanner driver, or other driver, for example may be used to communicate with the device 422 which may be any type of device from which information is desired or to which information or control signals are to be sent. The device driver 712 is implemented to translate commands or signals from the e-mail processor 710 to signals which are transmitted to the device 722 and vice versa. Alternatively, the e-mail processor 710 may perform more of the processing functions and the device driver 712 may have simple programming and few responsibilities. Further, any other implementation of the software may be utilized as long as the function of proper communication and control of the device 772 using e-mail messages is performed.

Figure 5B:
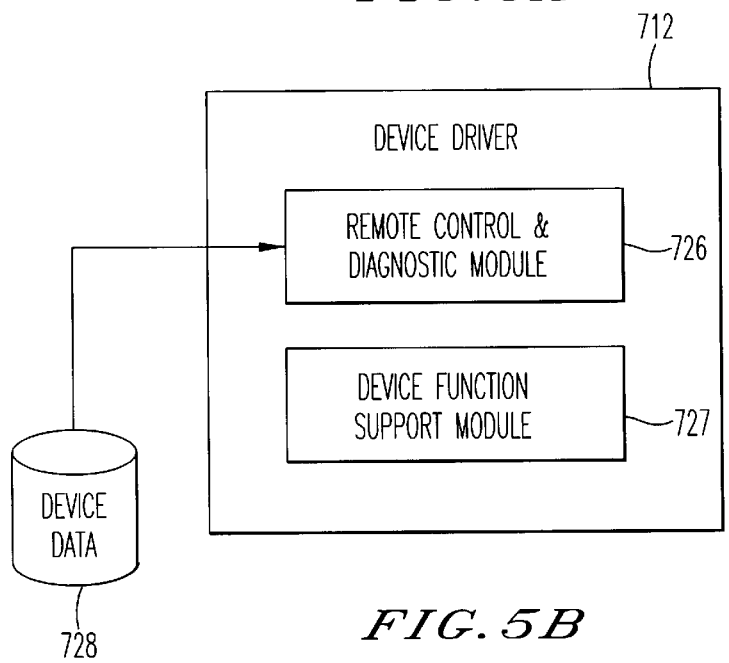
FIG. 5B illustrates a block diagram of the device driver of FIG. 5A.

A more detailed exemplary implementation of the device driver 712 of FIG. 5A is illustrated in FIG. 5B. The device driver 712 includes a device function support module 726 which may be implemented to perform the conventional and/or desired functions of a device driver. The device driver 712 also includes a remote control and diagnostic module 726. If desired, the remote control and diagnostic module 726 may be implemented to perform some or all of the control and/or diagnostic functions which are described in the related patent and patent applications and are incorporated by reference above. By implementing the control and diagnostic module 726 in the device driver 712, the cost of the device 712 may be reduced and the resources and capabilities of the device 712 may be eliminated or reduced such as by reducing the amount of memory in the device 712 such as DRAM (Dynamic Random Access Memory) or flash memory, for example. This reduced cost is possible as the hardware resources of the server 28 may be utilized in place of constructing additional hardware to go into the device 722, if desired. Various information including log information and error information may be stored in a data base which includes device data 728 using any desired hardware and data or data base management software. Further, software within the device 722 may be reduced by increasing the functions performed by the device driver 712 including functions performed by the remote control and diagnostic module 726 and the device function support module 724. These two software modules may be implemented in one software module, if desired. Additionally, the software which keeps track of the usage of the device may be removed from the device itself and included in the device driver 712.

Figure 6:
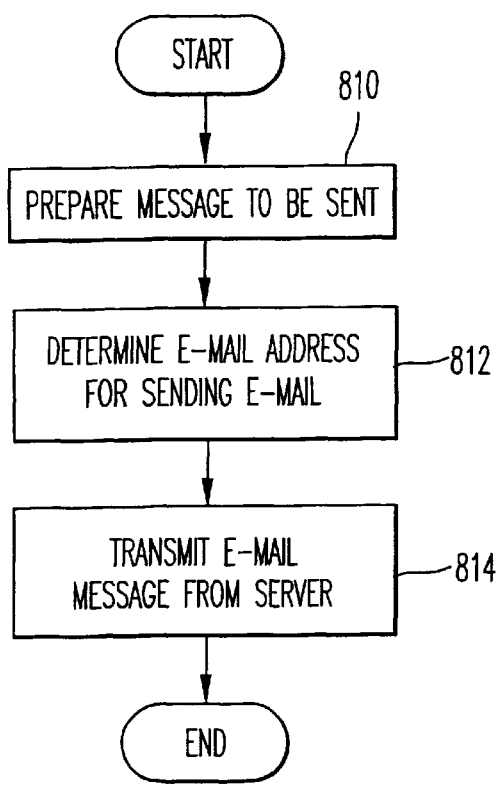
FIG. 6 illustrates a data flow diagram of FIG. 5A.

FIG. 6 illustrates a flow diagram of the process of transmitting to a customer, helpdesk, and/or dispatcher that a call or machine notification, including but not limited to, the service call, machine call or customer call, has been sent from the image machine. Step 810 prepares a corresponding email message for sending. The e-mail message may include the type of call, including either a manual call, service call, or customer call, the tag ID. Other information may also be included in the e-mail, the customer name, the customer address, the customer phone number, the model name, the copier S/N, the received date and time. Step 812 determines a corresponding e-mail address for sending. The e-mail address may be determined based on the machine event notification and the tag ID number. Step 814 transmits the corresponding e-mail from the server to the appropriate entities, for example the help desk and/or the dispatcher.

Figure 7:
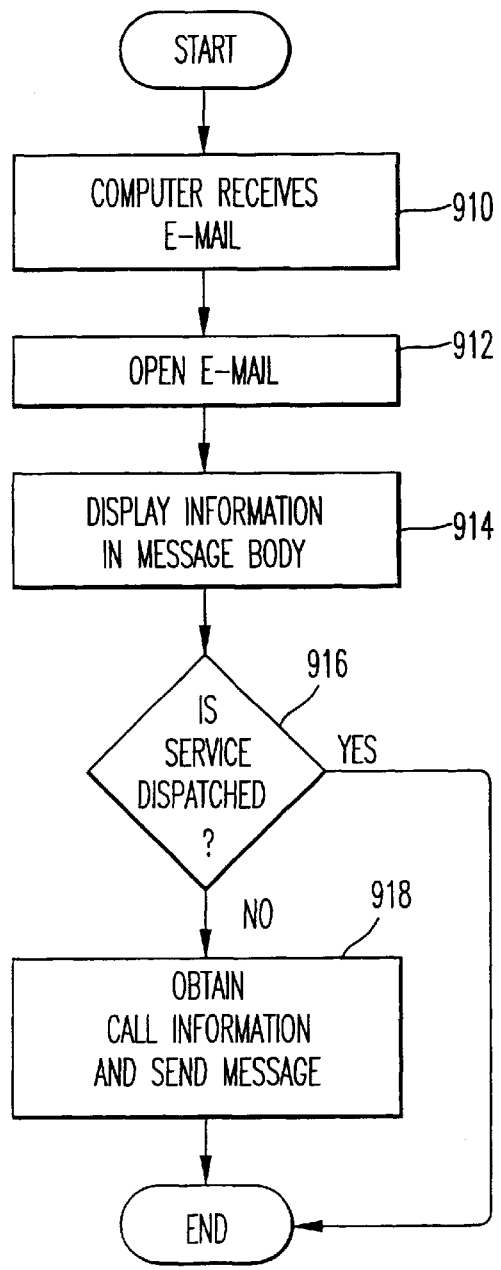
FIG. 7 illustrates a flow diagram of the help desk upon receiving an e-mail call request.

FIG. 7 illustrates a flow diagram of the process of the help desk receiving the e-mail. Step 910 receives the e-mail. Step 912 opens the e-mail. Step 914 displays information in the message body. Determination step 916 determines if service is dispatched. If service is dispatched then the process ends, for example by closing the call. If service is not dispatched, then step 918 obtains call information and sends a message.

FIG. 8A illustrates an exemplary e-mail message 950 used by the present invention. The message contains, at each line, information for processing a call from the machine. Line I indicates the subject of the e-mail message which includes at line 2 the service call generated and the received tag ID number. Line 3 indicates the content of the e-mail message which includes additional information indicated by lines 4–11. Line 4 indicates the customer name. Line 5 indicates the customer address. Line 6 indicates the customer phone number. Line 7 indicates the model name. Line 8 indicates the copier serial number. Line 9 indicates the tag ID number. Line 10 indicates the call code number. Line 11 indicates the received data and time. Additionally, e-mail may contain information which assists any of the entities in solving problems which caused the call.

FIG. 8B illustrates an alternate e-mail message 960 in which information is limited to the e-mail address and the tag ID number in the header. This e-mail message allows a user to obtain information without opening the e-mail to view contents. More information related to a copier may be obtained based on the tag ID number. This type of e-mail may be used with manual calls, customer calls, certain service calls, or any other appropriate type of call.

Figure 9:
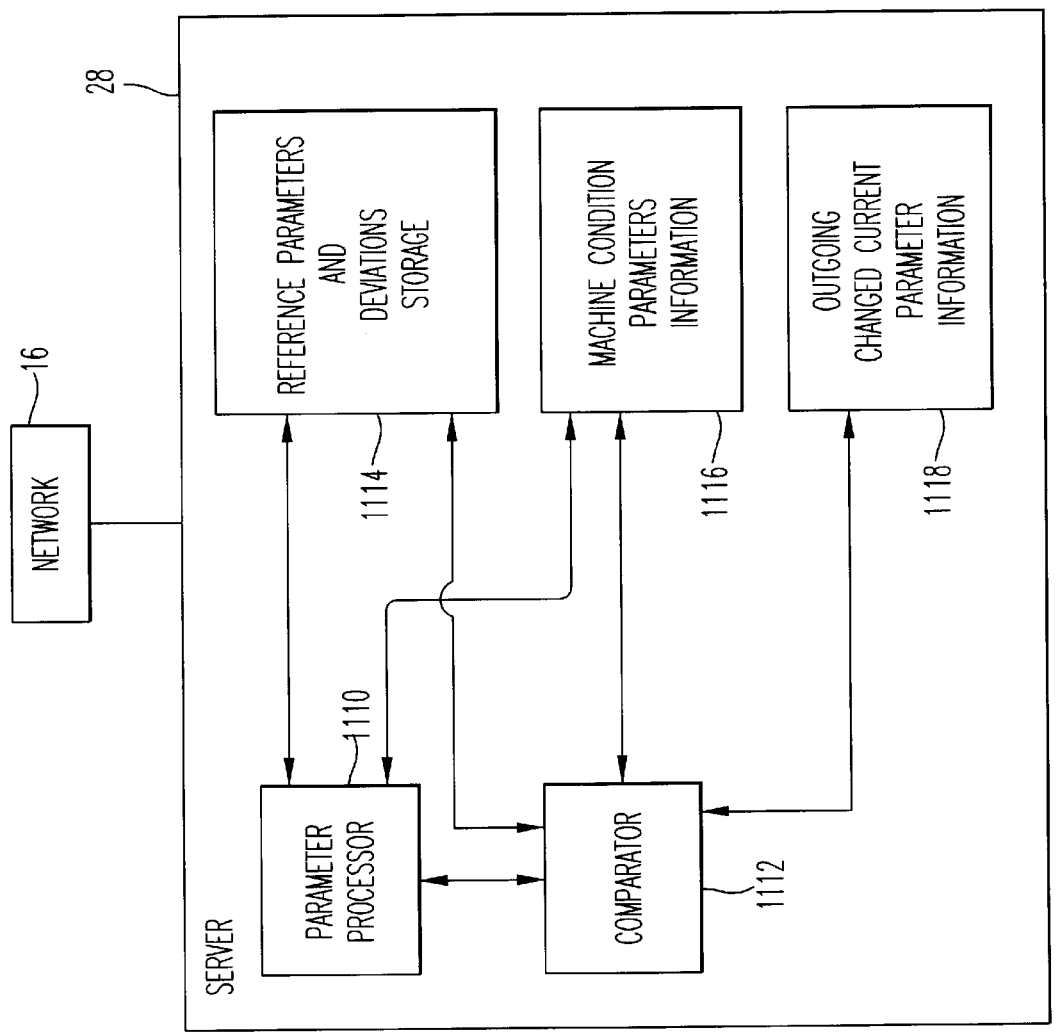
FIG. 9 illustrates a block diagram of related modules, objects and information which are located in a server.

FIG. 9 illustrates related modules, objects and information for evaluating machine condition data which may be implemented, for example, using the structure illustrated in FIG. 2. The server 28 includes a parameter processor 1110, a comparator 1112, a first parameter and deviation storage 1114, machine condition parameters information 1116, and outgoing changed current parameter information 1118. The parameter processor 1110 communicates with the first parameter and deviation storage 1114, and the incoming second parameters information 1116. The comparator 1112 communicates with parameter processor 1110, the first parameter and deviation storage 1114, the incoming second parameters information 1116, and the outgoing changed current parameter information 1118.

Server 28 is connected to the network 16. The network 16 is an appropriate network, for example the Internet, that permits sending and receiving of image machine data. Alternatively, a private network such as a WAN or LAN may be utilized, or a telephone may be utilized. The reference parameters and deviations storage 1114 stores data. The data includes the reference parameters related to each image machine in the system and the deviation values which are tolerances within which machine conditions are evaluated. Individual tolerances are predetermined for the machine condition parameters. Alternatively, tolerance may be adjusted as necessary. Reference parameters are obtained when the image machine is installed and is explained below with reference to FIG. 10. The machine condition parameters information 1116 includes current condition machine data which is indicative of the real-time conditions of the monitored machine. Exemplary machine condition data is described with reference to FIG. 15. During a request to diagnose or control the image machine, incoming second parameters information 1116 receives data which is indicative of the current conditions of the image machine. Outgoing changed parameter information 1118 includes machine condition data which is evaluated as changed from the reference parameter data and/or indicative of problems with the machine.

Comparator 1112 compares current machine condition parameters to reference parameters and deviations or tolerance ranges and standard values) which are obtained from reference parameters and deviations storage 1114. Parameter processor 1110 retrieves correlated reference parameters and deviations based on the current machine condition parameters and provides the changed second parameters for updating.

Figure 10:
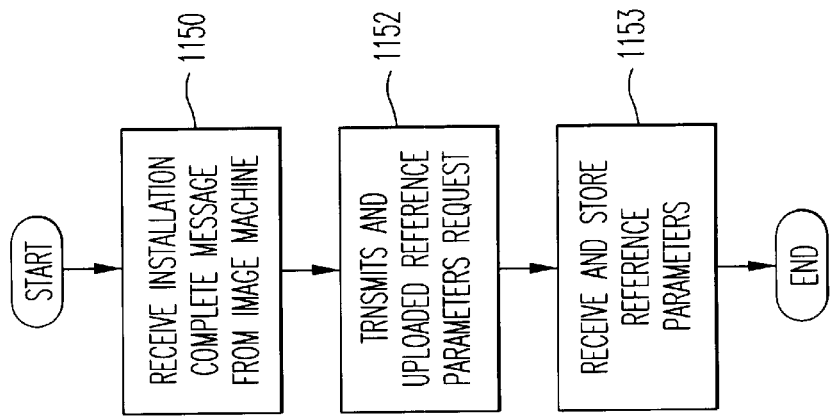
FIG. 10 illustrates a flow chart for obtaining reference parameters related to machine conditions.

FIG. 10 illustrates a flow diagram of initializing reference parameters of an image machine. After installation of the image machine at the customer location, at step 1150, the server receives the installation complete message. Step 1152 transmits an upload reference parameters request. The uploaded parameters request performs the function of querying the image machine to transmit the reference parameters. At step 1153, the server receives and stores the reference parameters in a hard disk or other appropriate storage; thus initialization of the reference parameters is complete.

Figure 11A:
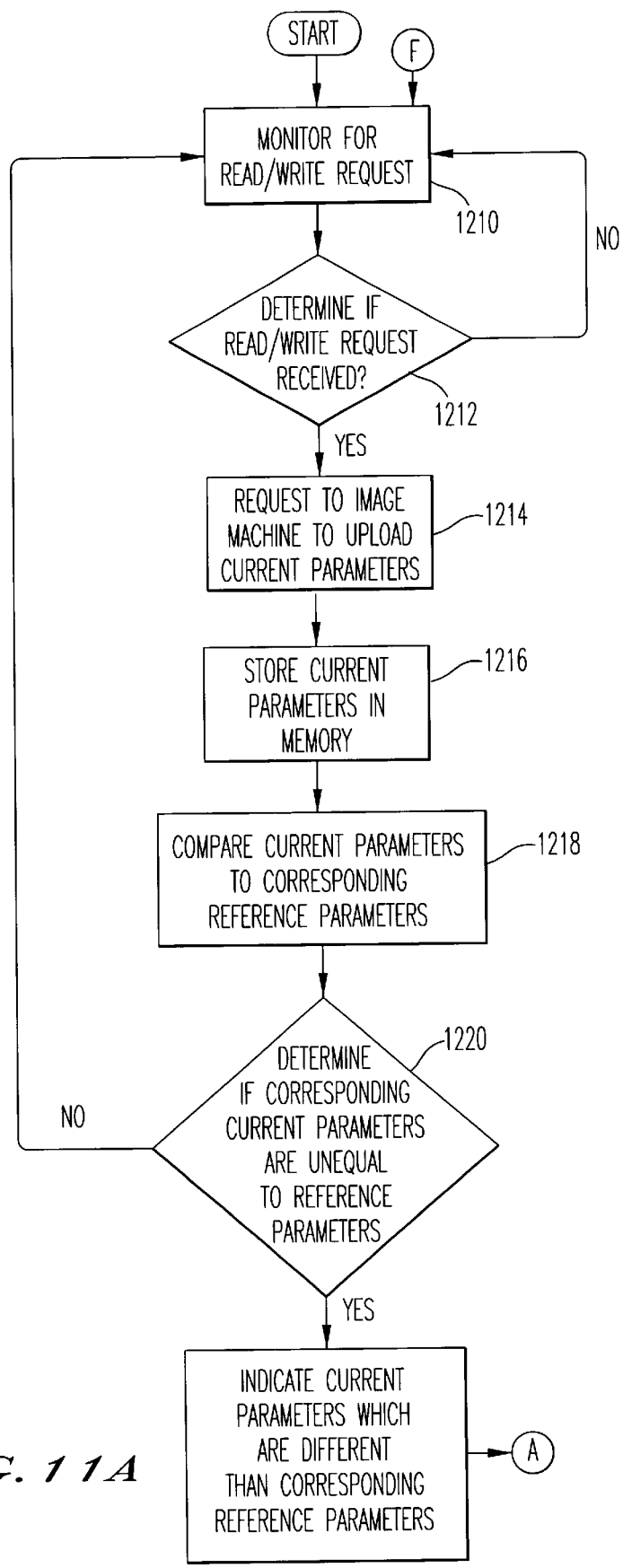
FIG. 11A and FIG. 11B illustrate a flowchart of the process performed, in the server, when monitoring the image forming machine for read/write requests.
Figure 11B:
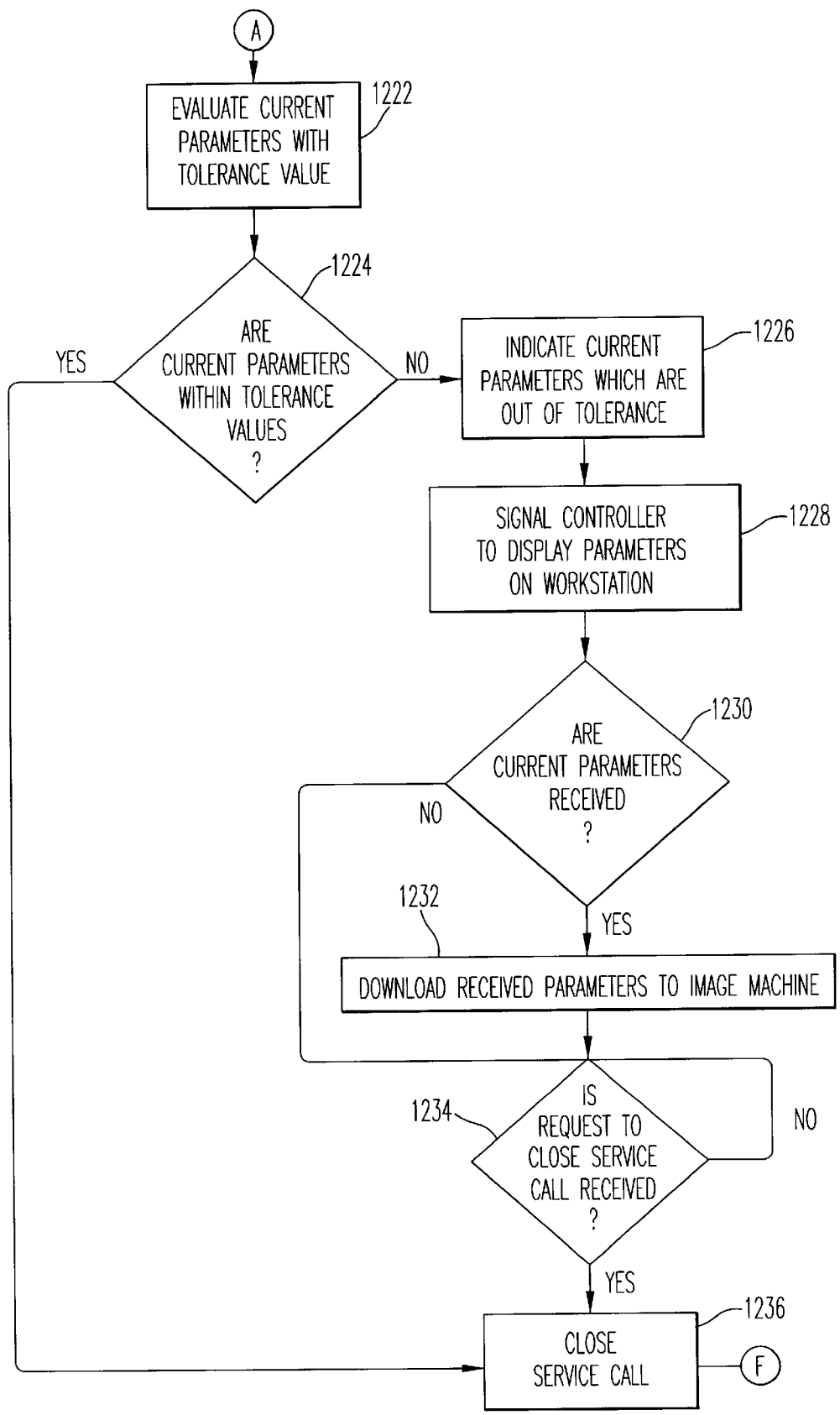

FIGS. 11A and 11B are flowcharts illustrating the process performed for monitoring and controlling image machines. The processes are performed in the server. Alternatively, it should be appreciated that the process may be performed at another part of the system. After initializing reference parameters for any image machine that is included in the system, step 1210 monitors for machine event notification or service or read/write requests transmitted from image machines or helpdesk. Read/write requests may be generated from the machine, the customer or the server. Step 1212 determines if a read/write request is received. If a read/write request is not received, then monitoring for read/write requests continues. If a read/write request is received, then step 1214 requests to the image machine to upload parameters indicative of the current machine conditions. Step 1216 stores current parameters in memory. Step 1218 compares current parameters to corresponding reference parameters.

Step 1220 determines if current parameters are unequal to corresponding reference parameters. If the parameters are not different, then monitoring for read/write requests continues at step 1210. If the parameters are different, then step 1221 indicates current parameters which are unequal to corresponding reference parameters. Step 1222 evaluates the current parameters based on the tolerance values. Step 1224 determines if current parameters are within the tolerance values. If current parameters are within the tolerance values, then step 1236 closes the service call. Tolerances provide a range within which current machine condition parameters may be compared. For example, if the left edge register adjustment indicates a current machine condition value of 0.5 and the reference parameter (or present value) is 0.1 with a tolerance or setting range of −90 to +90. If current parameters are not within the tolerance values, then step 1226 indicates current parameters which are out of tolerance. Current parameters are indicated by highlighting parameters out of the tolerance range. Step 1228 signals controller to display parameters on workstation.

Step 1230 determines if current parameters are received by image machine. If current parameters are not received, then step 1234 determines if request to close service call is received. The service call is received by the RMS server. If the request is received, then step 1236 closes the service call and continues monitoring the machine for read/write requests, otherwise step 1234 is iterative. If current parameters are received, then step 1232 downloads received parameters to image machine. Step 1234 determines if a request to close manual call is received. If request is received, then step 1236 closes the service call and continues monitoring the machine for read/write requests, otherwise step 1234 is iterative.

Figure 12A:
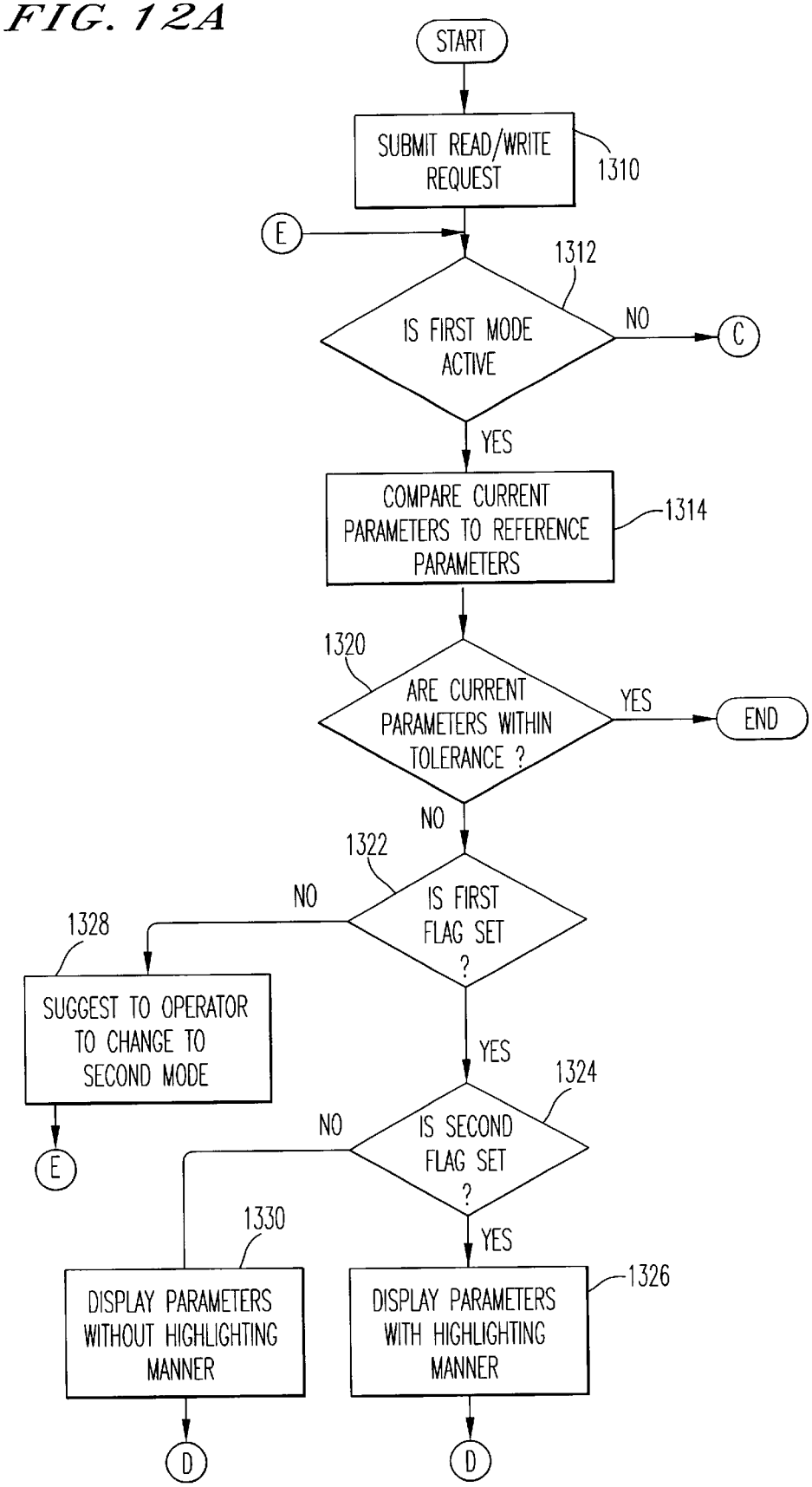
FIG. 12A, FIG. 12B and FIG. 12C illustrate a flowchart of the process performed when a read/write function is activated.
Figure 12B:
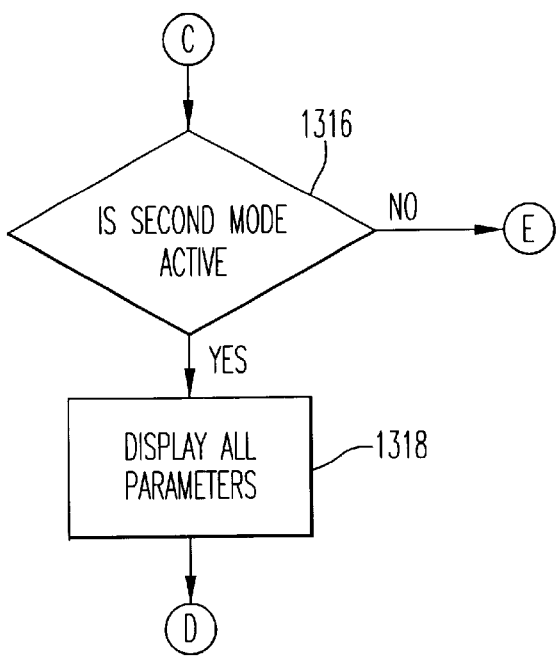

FIGS. 12A and 12B are flowcharts illustrating the process performed by the customer or helpdesk. After starting, step 1310 submits a read/write request via an input device such as a mouse, keyboard or other appropriate device such as a touch screen.

Step 1312 determines if a first mode is active. The first mode and a second mode may be available at the server, and customer and help desk workstations. The first mode allows the operators to select between a first displaying mode and a second displaying mode, the first displaying mode is the mode to display parameters with unequal flags set and highlight the parameters with out of tolerance flags set. The second mode is the mode to display all current machine parameters without regard to flags.

If the first mode is not active, then step 1316 determines if the second mode is active. If the second mode is not active then step 1312 determines if the first mode is active, otherwise, step 1318 displays all the parameters. If the first mode is active, then step 1314 compares current parameters to the corresponding reference parameters.

Step 1320 determines if the current parameters are within tolerance. If current parameters are within tolerance, then read/write request ends; otherwise step 1322 determines if a first flag is set. The first flag is set and indicates that current parameters are unequal to corresponding reference parameters. If the first flag is not set, then step 1328 suggests that the operator change to second mode, then flow proceeds step 1312 to determine if the first mode is active. If the first flag is set, then step 1324 determines if the second flag is set. Second flag is set to indicate current machine parameters which are out of the tolerance range. The unequal current machine conditions are compared by using the tolerance range which may have an upper limit value and lower limit value. If the current parameter is out of the deviation, a tolerance error indicator of a second flag is set on the current parameter. If second flag is not set, then step 1330 displays current parameters without highlighting manner. If second flag is set, then step 1326 displays current parameters with highlighting manner.

Figure 12C:
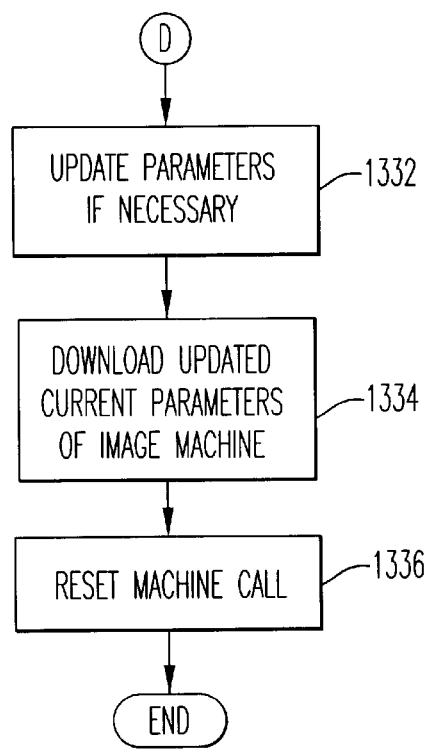

In FIG. 12C, step 1332 updates parameters based on a need to know current machine conditions for future monitoring and controlling. For example, if the fusing temperature is different than the reference fusing temperature, then it is updated because the current fusing temperature is needed to monitor and control the image machine. Step 1334 downloads updated current parameters at image machine. Step 1336 resets service call and ends read/write request.

FIG. 13 is an exemplary call list 1400. The call list 1400 indicates data including sequential numbers indicating when the calls were transmitted (SEQ) 1410, service organization (SO) 1412, customer 1414, model 1416, machine notification call 1418, cause/solution input 1420, LC list 1422, call 1424, time received 1426, elapsed time 1428 and operator 1430. The calls are each listed at each line and are displayed in a sequential sort. However, it should be appreciated that any of data may be used to organize the display of the call list.

FIG. 14A is an exemplary call detail 1500 including symptom, cause and solution data 1510, L-ADP/copier information data 1520, unsettled data 1530 such as SEQ, SC, time received and elapsed time. Call detail 1500 also includes activation regions which may be clicked on or touch activated if displayed on a touch screen, and then will open more data or screens. Activation regions include, but are not limited to, read/write 1540, machine condition data 1550, service call/jam data 1560, call history 1570, loop test 1580, execute 1582 and read 1584.

FIGS. 14B.1 and 14B.2 is machine call and jam data which may be displayed by activating service call (SC)/jam data in the call detail as shown in service call (SC)/jam data 1560 of FIG. 14A. Service call and jam data 1662 includes 1-ADP/copier information 1564 and service call and jam data 1566. This data indicates the information to identify which machine is having a problem and the related machine notification, for example, a service call, and related paper jam information.

FIGS. 15A to 15K are an exemplary read/write screen 1600 for image machine data. Screen 1600 includes L-ADP/copier information 1610 such as date received, customer, installed section, contact, model/serial number, particular notes, tag ID, and service organization (SO)/ service dealer (SD). Read write items 1620A to 1620I includes, number (No.), item, standard which is a factory setting which is a predetermined desired value for a particular machine, setting range or tolerance within which machine condition data is evaluated, reference parameters which may be predetermined for a particular machine after installation or adjusted during based on usage, current machine condition parameters, and new values which has a write capability such that a user can input data into the new values and activate a write command. Consequently, the values will be read into memory.

FIGS. 16A to 16G are exemplary machine condition data 1700 including LADP/copier information 1720, state information 1730 and jam history 1750A, 1750B, counter 1750A, 1750B, 1750C, operation time 1760A, 1760B indicating the total time the machine has been in operation, and 1770 service call (SC) history indicating the service call history. It should be appreciated that any machine notification history such as manual call history and customer call history may be included. Also included in machine condition data 1700 is sensor output, ROM, 1780A, 1780B, copy counter by user 1790, not used 1792, alarm information 1794, SC information 1796 and read/write change information 1798.

FIGS. 17A and 17B are exemplary identification information related to the machines. The identification information 1800 includes customer information 1810, LADP information 1820, and related copier information 1830 which includes information related to all copiers with the same customer information 1810 and LADP information 1820. For example, all copiers as a customer site may be referenced to the same customer and LADP information. This information is stored in server 28. Alternatively, each help desk may store this type of information.

Figure 18:
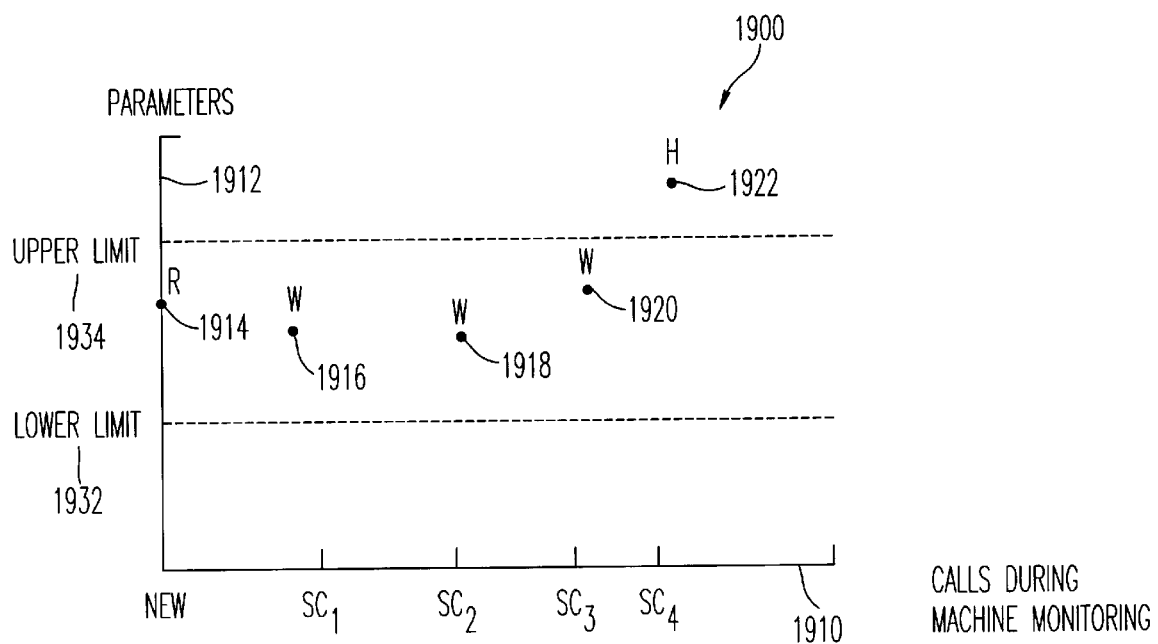
FIG. 18 illustrates a chart indicating calls during monitoring and associated displayed and undisplayed parameters.

FIG. 18 is a table including a manual call during monitoring axis 1910 and a parameter axis 1912. Tolerance values of a lower limit 1932 and an upper limit 1934 are determined. After reference parameters R 1914 is obtained from a newly installed machine, then machine calls occur over time. Each service call (SC) generates current machine condition parameters W 1916, W 1918, W 1920 and H 1922, respectively. The W 1916, 1918, 1920 indicates current parameters which are indicative machine conditions within the tolerance and which are not displayed in a highlighted manner. The H 1922 parameter indicates current parameters which are not within the tolerance range and are displayed highlighted.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A method of monitoring an image forming apparatus, comprising:

communicating from the image forming apparatus to a server which is remote from the image forming apparatus a condition of the image forming apparatus;

sending an email from the server to a terminal which is remote from the image forming apparatus and remote from the server;

reading the email at the terminal, using an email program; and viewing, in response to a reading of the email, a condition of the image forming apparatus, using a browser.

2. The method of claim 1, wherein the step of viewing comprises:

viewing the condition using a web browser which is different from the email program.

3. The method according to claim 2, wherein the step of sending is performed in response to an abnormal condition in the image forming apparatus.

4. The method according to claim 2, wherein the step of communicating is performed in response to an abnormal condition in the image forming apparatus.

5. A method of monitoring an image forming apparatus, comprising the steps of:

determining at the image forming apparatus a machine notification based on a condition of the image forming apparatus;

transmitting, from the image forming apparatus to a server, said machine notification;

determining, at said server, at least one electronic address which is capable of receiving an electronic message, whereby the step of determining is based on the machine notification;

sending, from said server to at least one terminal which is remote from the image forming apparatus, said electronic message based on said machine notification;

opening, at said remote computer, a browser; and accessing, via said browser, data related to operation of said image forming apparatus, said data determined based on said electronic message.

6. The method of claim 5, wherein said electronic message is at least one of an e-mail, a telephone call and a pager message.

7. The method of claim 5, wherein said machine notification includes a machine identification and a type of machine notification.

8. The method of claim 5, further including the steps of:

sending, to said image forming apparatus, a termination of said machine notification, said termination based on the evaluation of said data.

9. The method of claim 5, wherein said machine notification is selected from the group consisting of a manual call, a service call and a customer call.

10. The method of claim 5, wherein said machine notification is automatically initiated by said image forming apparatus.

11. The method of claim 5, wherein said machine notification is initiated by a user at said image machine.

12. The method of claim 5, further including the steps of:

adjusting, from the server, said data associated with operation of said image machine.

13. An image forming apparatus monitoring system, comprising:

means for communicating from the image forming apparatus to a server which is remote from the image forming apparatus a condition of the image forming apparatus;

means for sending an email from the server to a terminal which is remote from the image forming apparatus and remote from the server;

means for reading the email at the terminal, using an email program; and means for viewing, in response to a reading of the email, a condition of the image forming apparatus, using a browser.

14. The system of claim 13, wherein said means for viewing includes a web browser which is different from the email program.

15. The system of claim 13, wherein said e-mail is sent based on an abnormal condition in the image forming apparatus.

16. The system of claim 15, wherein said abnormal condition is selected from the group consisting of hardware problems, software problems, or combinations thereof.

17. The system of claim 15, wherein said condition is communicated based on said abnormal condition in the image forming apparatus.

18. The system of claim 13, further comprising:

a resource planning system which determines, based on said machine notification, a status of service dispatching.

19. A system for monitoring an image forming apparatus, comprising:

means for determining at the image forming apparatus a machine notification based on a condition of the image forming apparatus;

means for transmitting, from the image forming apparatus to a server, said machine notification;

means for determining, at said server, at least one electronic address which is capable of receiving an electronic message, whereby the step of determining is based on the machine notification;

means for sending, from said server to at least one terminal which is remote from the image forming apparatus, said electronic message based on said machine notification;

means for opening, at said remote computer, a browser; and means for accessing, via said browser, data related to operation of said image forming apparatus, said data determined based on said electronic message.

20. The system of claim 19, wherein said electronic message is at least one of an e-mail, a telephone call and a pager message.

21. The system of claim 19, wherein said machine notification includes a machine identification and a type of machine notification.

22. The system of claim 19, further comprising:

means for sending, to said image forming apparatus, a termination of said machine notification, said termination based on the evaluation of said data.

23. The method of claim 19, wherein said machine notification is selected from the group consisting of a manual call, a service call and a customer call.

24. The method of claim 19, wherein said machine notification is automatically initiated by said image forming apparatus.

25. The method of claim 19, wherein said machine notification is initiated by a user at said image machine.

26. The method of claim 19, further including the steps of:

adjusting, from the server, said data associated with operation of said image machine.

27. A method of communicating, comprising:

sending an email from a first device containing information related to an image forming apparatus to a second device;

reading the email at the second device, using an email program; and viewing, in response to a reading of the email, a condition of the image forming apparatus, using a browser.

28. A system for communicating, comprising:

means for sending an email from a first device containing information related to an image forming apparatus to a second device;

means for reading the email at the second device, using an email program; and means for viewing, in response to a reading of the email, a condition of the image forming apparatus, using a browser.

* * * * *